(12) United States Patent
Green et al.

(10) Patent No.: US 12,348,843 B2
(45) Date of Patent: *Jul. 1, 2025

(54) IMAGE ORIENTATION CONTROL FOR A PORTABLE DIGITAL VIDEO CAMERA

(71) Applicant: Contour IP Holding, LLC, Provo, UT (US)

(72) Inventors: Jason Green, Seattle, WA (US); Marc Barros, Bellevue, WA (US); David Thorpe, Portland, OR (US); Chunshik Kim, Portland, OR (US); Felix Ballerstedt, Portland, OR (US); David Randall Knaub, Portland, OR (US); Oved Valadez, Portland, OR (US); Peter Kettenring, Reinhem (DE); Margaret Novotny, Greenbrae, CA (US); Laura O'Donnell, El Segundo, CA (US); Jeff Howard, San Francisco, CA (US)

(73) Assignee: Contour IP Holding, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,455

(22) Filed: Apr. 15, 2022

(65) Prior Publication Data
US 2022/0311912 A1 Sep. 29, 2022

Related U.S. Application Data

(60) Continuation of application No. 17/198,048, filed on Mar. 10, 2021, now Pat. No. 11,310,398, which is a
(Continued)

(51) Int. Cl.
*H04N 23/50* (2023.01)
*G01S 17/875* (2020.01)
(Continued)

(52) U.S. Cl.
CPC .......... *H04N 23/50* (2023.01); *G01S 17/875* (2013.01); *G06T 7/70* (2017.01); *H04N 23/51* (2023.01); *G06T 2207/30244* (2013.01)

(58) Field of Classification Search
CPC ...... H04N 23/50; H04N 23/51; G01S 17/875; G06T 7/70; G06T 2207/30244
(Continued)

(56) References Cited

U.S. PATENT DOCUMENTS

D246,528 S 11/1977 Miller
D247,420 S 3/1978 Reynolds
(Continued)

FOREIGN PATENT DOCUMENTS

CA 2463117 A1 8/2004
CN 1223768 A 7/1999
(Continued)

OTHER PUBLICATIONS

X170 Action Camera and Mounts, http://www.actioncameras.co.uk/X170, accessed Nov. 2, 2009, 4 pages.
(Continued)

*Primary Examiner* — Usman A Khan
(74) *Attorney, Agent, or Firm* — Knobbe, Martens, Olson & Bear, LLP

(57) ABSTRACT

An integrated hands-free, point of view, action-sports, digital video camera (or camcorder) (10) includes: a rotary horizon adjustment controller (14) for adjusting the orientation of a horizontal image plane (16) recorded by an image sensor with respect to the orientation of a camera housing (22); a laser alignment system with laser sources (48) capable of projecting light to define a horizontal projection axis (52) that is coordinated with orientation of the horizontal image plane (16); a manually operable switch (80), which covers a microphone (90) whenever the switch (80) is in the
(Continued)

OFF position, for controlling video data capture; and a "quick-release" mounting system (120) that retains a desired orientation of the camera (10).

20 Claims, 15 Drawing Sheets

Related U.S. Application Data continuation of application No. 16/664,330, filed on Oct. 25, 2019, now Pat. No. 10,965,843, which is a continuation of application No. 15/181,112, filed on Jun. 13, 2016, now Pat. No. 10,477,078, which is a continuation of application No. 13/674,817, filed on Nov. 12, 2012, now abandoned, which is a division of application No. 12/671,442, filed on May 14, 2010, now Pat. No. 8,792,041, which is a continuation-in-part of application No. 29/322,219, filed as application No. PCT/US2008/071661 on Jul. 30, 2008.

(60) Provisional application No. 60/952,810, filed on Jul. 30, 2007.

(51) Int. Cl.
*G06T 7/70* (2017.01)
*H04N 23/51* (2023.01)

(58) Field of Classification Search
USPC .......................................................... 348/375
See application file for complete search history.

(56) References Cited

U.S. PATENT DOCUMENTS

| | | | |
|---|---|---|---|
| 4,516,157 A | 5/1985 | Campbell | |
| 4,525,045 A | 6/1985 | Fazekas | |
| 4,666,275 A * | 5/1987 | Tamamura | G03B 15/05 |
| | | | 396/544 |
| D292,982 S | 12/1987 | Nakatani | |
| D305,608 S | 1/1990 | Hahn | |
| 5,056,745 A | 10/1991 | Gelbard | |
| 5,218,439 A | 6/1993 | Mizoguchi et al. | |
| D342,953 S | 1/1994 | Yoder | |
| 5,526,037 A | 6/1996 | Cortjens et al. | |
| 5,557,329 A | 9/1996 | Lim | |
| 5,583,571 A | 12/1996 | Friedland | |
| D378,095 S | 2/1997 | Hasegawa | |
| D381,113 S | 7/1997 | Safyan | |
| D392,300 S | 3/1998 | Chow et al. | |
| 5,731,870 A | 3/1998 | Bartko et al. | |
| 5,859,666 A | 1/1999 | Manabe | |
| D408,727 S | 4/1999 | Sherman | |
| 5,966,176 A | 10/1999 | Chow et al. | |
| 6,028,627 A | 2/2000 | Helmsderfer | |
| 6,091,831 A | 7/2000 | Cho | |
| D430,888 S | 9/2000 | Adachi et al. | |
| 6,142,437 A | 11/2000 | Wilkins, Jr. | |
| D436,028 S | 1/2001 | Wagner et al. | |
| 6,196,504 B1 * | 3/2001 | Lemke | F16M 11/041 |
| | | | 396/428 |
| 6,300,976 B1 | 10/2001 | Furuoka | |
| 6,335,753 B1 | 1/2002 | McDonald | |
| 6,377,302 B1 | 4/2002 | Ozaki et al. | |
| 6,421,088 B1 | 7/2002 | Lee | |
| D467,605 S | 12/2002 | Oordick | |
| 6,518,881 B2 | 2/2003 | Monroe | |
| D475,385 S | 6/2003 | Christianson | |
| D483,788 S | 12/2003 | Dordick | |
| D484,168 S | 12/2003 | Dordick | |
| 6,663,064 B1 | 12/2003 | Minelli et al. | |
| 6,686,886 B2 | 2/2004 | Flint | |
| 6,704,044 B1 | 3/2004 | Foster et al. | |
| 6,819,354 B1 | 11/2004 | Foster et al. | |
| 6,825,875 B1 | 11/2004 | Strub et al. | |
| 6,830,387 B2 | 12/2004 | Rife | |
| D501,015 S | 1/2005 | Hamilton et al. | |
| D501,016 S | 1/2005 | Hamilton et al. | |
| D506,489 S | 6/2005 | Owada | |
| D510,374 S | 10/2005 | Greenwood | |
| 6,955,484 B2 | 10/2005 | Woodman | |
| 6,956,599 B2 | 10/2005 | Lim et al. | |
| D515,124 S | 2/2006 | Bleau et al. | |
| D516,416 S | 3/2006 | Friedline et al. | |
| D516,903 S | 3/2006 | Friedline et al. | |
| 7,084,921 B1 | 8/2006 | Ogawa | |
| D534,938 S | 1/2007 | Beasley et al. | |
| 7,171,018 B2 | 1/2007 | Rhoads et al. | |
| D536,607 S | 2/2007 | Bekkevold | |
| D537,939 S | 3/2007 | Phillips et al. | |
| D544,009 S | 6/2007 | Alm et al. | |
| D547,346 S | 7/2007 | Ollila | |
| 7,256,944 B2 | 8/2007 | Labaziewicz et al. | |
| 7,273,321 B2 | 9/2007 | Woodman | |
| D558,805 S | 1/2008 | Sadatsuki | |
| 7,330,511 B2 | 2/2008 | Maltaaliati et al. | |
| D563,444 S | 3/2008 | Brickzin | |
| 7,353,086 B2 | 4/2008 | Ennis | |
| 7,404,001 B2 | 7/2008 | Cambell et al. | |
| D576,658 S | 9/2008 | Speggiorin | |
| D581,959 S | 12/2008 | Chan | |
| 7,458,736 B2 | 12/2008 | Woodman | |
| D584,604 S | 1/2009 | Baldwin | |
| D591,325 S | 4/2009 | Dordick | |
| 7,522,834 B2 | 4/2009 | Heaven et al. | |
| 7,526,314 B2 | 4/2009 | Kennedy | |
| D592,231 S | 5/2009 | Schnell | |
| D592,235 S | 5/2009 | Bryant et al. | |
| D596,658 S | 7/2009 | Dordick | |
| 7,561,201 B2 | 7/2009 | Hong | |
| D599,478 S | 9/2009 | Bizup et al. | |
| D600,736 S | 9/2009 | Zen | |
| 7,593,576 B2 | 9/2009 | Meyer et al. | |
| D603,442 S | 11/2009 | Dordick | |
| 7,658,556 B2 | 2/2010 | Johnson | |
| 7,661,891 B2 | 2/2010 | Heibel | |
| 7,688,203 B2 | 3/2010 | Rockefeller | |
| D616,006 S | 5/2010 | Green et al. | |
| 7,725,015 B2 | 5/2010 | Tanoue | |
| 7,733,416 B2 | 6/2010 | Gal | |
| 7,753,599 B2 | 7/2010 | Segawa et al. | |
| D621,435 S | 8/2010 | Green et al. | |
| 7,778,237 B2 | 8/2010 | Dowling | |
| D628,225 S | 11/2010 | Deurwaarder | |
| D629,440 S | 12/2010 | Newman | |
| 7,856,468 B2 | 12/2010 | Yoshimine et al. | |
| D630,238 S | 1/2011 | Fukuma et al. | |
| D638,459 S | 5/2011 | Park | |
| D640,304 S | 6/2011 | Green et al. | |
| D640,722 S | 6/2011 | Green et al. | |
| D643,057 S | 8/2011 | Mendoza et al. | |
| 8,014,656 B2 | 9/2011 | Woodman | |
| D646,315 S | 10/2011 | Ort | |
| 8,045,850 B2 | 10/2011 | Tanoue | |
| D649,175 S | 11/2011 | Willis | |
| 8,079,501 B2 | 12/2011 | Woodman | |
| 8,099,289 B2 | 1/2012 | Mozer et al. | |
| D653,692 S | 2/2012 | Dordick | |
| 8,120,651 B2 | 2/2012 | Ennis | |
| D662,120 S | 6/2012 | Deurwaarder | |
| D663,350 S | 7/2012 | O'Donnell et al. | |
| D665,006 S | 8/2012 | Green et al. | |
| 8,237,856 B2 | 8/2012 | Boland et al. | |
| D675,242 S | 1/2013 | O'Donnell et al. | |
| 8,451,822 B2 | 5/2013 | Dowling | |
| 8,526,779 B1 | 9/2013 | Simmons et al. | |
| 8,593,570 B2 | 11/2013 | Boland et al. | |
| D698,846 S | 2/2014 | Isozaki | |
| 8,737,803 B2 | 5/2014 | Pereira et al. | |
| 8,792,014 B2 | 7/2014 | Green et al. | |
| 8,941,747 B2 | 1/2015 | Boland et al. | |
| 8,953,929 B2 | 2/2015 | Boand et al. | |

(56) References Cited

U.S. PATENT DOCUMENTS

| Patent/Pub No. | Date | Inventor |
|---|---|---|
| 9,286,776 B1 | 3/2016 | Morton |
| 9,742,975 B2 | 8/2017 | O'Donnell et al. |
| 10,477,078 B2 | 11/2019 | Green et al. |
| 11,310,398 B2 | 4/2022 | Green et al. |
| 2002/0001469 A1 | 1/2002 | Prather et al. |
| 2002/0057294 A1 | 5/2002 | Ejima et al. |
| 2002/0067920 A1 | 6/2002 | Weng et al. |
| 2002/0163588 A1 | 11/2002 | Holmberg |
| 2002/0167611 A1 | 11/2002 | Boemler et al. |
| 2002/0170064 A1 | 11/2002 | Monroe et al. |
| 2003/0063200 A1 | 4/2003 | Isoyama |
| 2003/0128975 A1 | 7/2003 | Shevick |
| 2003/0147960 A1 | 8/2003 | Lin et al. |
| 2003/0157960 A1 | 8/2003 | Kennedy |
| 2003/0227561 A1 | 12/2003 | Sakata et al. |
| 2003/0228847 A1 | 12/2003 | Matsumoto |
| 2004/0004825 A1 | 1/2004 | Malard et al. |
| 2004/0075739 A1 | 4/2004 | Wada |
| 2004/0114919 A1 | 6/2004 | Rife |
| 2004/0247161 A1 | 12/2004 | Storm |
| 2005/0151876 A1 | 7/2005 | Karr |
| 2005/0168567 A1 | 8/2005 | Boon |
| 2005/0200750 A1 | 9/2005 | Ollila |
| 2005/0206736 A1 | 9/2005 | Ng et al. |
| 2005/0229108 A1 | 10/2005 | Sadek |
| 2006/0009257 A1 | 1/2006 | Ku |
| 2006/0055786 A1 | 3/2006 | Ollila |
| 2006/0056836 A1* | 3/2006 | Ramadan ........... F16M 11/2007 348/E13.008 |
| 2006/0095331 A1 | 5/2006 | O'malley |
| 2006/0098186 A1 | 5/2006 | Yumiki |
| 2006/0133786 A1 | 6/2006 | Teramoto |
| 2006/0222341 A1 | 10/2006 | Ikehata et al. |
| 2006/0229108 A1 | 10/2006 | Cehelnik |
| 2006/0238637 A1 | 10/2006 | Goto et al. |
| 2006/0239677 A1* | 10/2006 | Friedrich ............. F16M 11/08 396/419 |
| 2006/0262214 A1 | 11/2006 | Koyama et al. |
| 2006/0271251 A1 | 11/2006 | Hopkins |
| 2006/0274171 A1 | 12/2006 | Wang |
| 2007/0031142 A1 | 2/2007 | Moody et al. |
| 2007/0035612 A1 | 2/2007 | Korneluk |
| 2007/0047918 A1 | 3/2007 | Park |
| 2007/0050139 A1* | 3/2007 | Sidman ................. F16M 11/18 318/649 |
| 2007/0070184 A1 | 3/2007 | Kim et al. |
| 2007/0084979 A1* | 4/2007 | Hofner ................. F16M 11/16 248/177.1 |
| 2007/0111754 A1 | 5/2007 | Marshall et al. |
| 2007/0126883 A1 | 6/2007 | Ishige et al. |
| 2007/0152116 A1 | 7/2007 | Madsen |
| 2007/0291165 A1 | 12/2007 | Wang |
| 2008/0039072 A1 | 2/2008 | Bloebaum |
| 2008/0060248 A1 | 3/2008 | Pine et al. |
| 2008/0104018 A1 | 5/2008 | Xia |
| 2008/0133227 A1 | 6/2008 | Kong et al. |
| 2008/0170130 A1 | 7/2008 | Ollila et al. |
| 2008/0259045 A1 | 10/2008 | Kim et al. |
| 2009/0058660 A1 | 3/2009 | Torch |
| 2009/0086041 A1 | 4/2009 | Choi et al. |
| 2009/0109292 A1 | 4/2009 | Ennis |
| 2009/0122177 A1 | 5/2009 | Murakami |
| 2009/0195655 A1 | 8/2009 | Pandey |
| 2010/0026816 A1 | 2/2010 | Bergstrom et al. |
| 2010/0061711 A1 | 3/2010 | Woodman |
| 2010/0245585 A1 | 9/2010 | Fisher et al. |
| 2010/0253826 A1 | 10/2010 | Green et al. |
| 2010/0304783 A1 | 12/2010 | Logan et al. |
| 2011/0096168 A1 | 4/2011 | Siann et al. |
| 2011/0280540 A1 | 11/2011 | Woodman |
| 2012/0176470 A1 | 7/2012 | Zhang |
| 2013/0063554 A1 | 3/2013 | Green et al. |
| 2014/0049636 A1 | 2/2014 | O'Donnell et al. |
| 2014/0105589 A1 | 4/2014 | Samuels |
| 2021/0195069 A1 | 6/2021 | Green et al. |

FOREIGN PATENT DOCUMENTS

| | | |
|---|---|---|
| CN | 1425953 A | 6/2003 |
| CN | 1467557 A | 1/2004 |
| CN | 1530958 A | 9/2004 |
| CN | 1628329 A | 6/2005 |
| CN | 1549419 A | 8/2006 |
| CN | 1856067 A | 11/2006 |
| CN | 1921595 A | 2/2007 |
| CN | 101150668 A | 3/2008 |
| CN | 102148923 A | 8/2011 |
| CN | 102413272 A | 4/2012 |
| CN | 101084817 A | 8/2012 |
| CN | 102082906 A | 4/2013 |
| DE | 19831819 C1 | 7/1998 |
| DE | 202004001608 U1 | 5/2004 |
| EP | 0917359 A1 | 5/1999 |
| EP | 0980181 | 2/2000 |
| EP | 1 160 499 A1 | 12/2001 |
| EP | 1638326 A1 | 3/2006 |
| EP | 1903782 A2 | 3/2008 |
| EP | 1944965 A1 | 7/2008 |
| EP | 2183910 | 5/2010 |
| EP | 2070322 A2 | 2/2011 |
| EP | 3934230 A1 | 1/2022 |
| FR | 2870365 A3 | 11/2005 |
| GB | 2403366 A | 6/2003 |
| JP | 61-118076 | 6/1986 |
| JP | H08-125961 A | 5/1996 |
| JP | 08-223524 | 8/1996 |
| JP | 2004-233682 A | 8/2004 |
| JP | 2007-019644 A | 1/2007 |
| JP | 2009-021914 A | 1/2009 |
| WO | WO 94/26061 | 11/1994 |
| WO | WO 96/38004 | 11/1996 |
| WO | WO 2006/071123 A1 | 7/2006 |
| WO | WO 2007/031248 A2 | 3/2007 |
| WO | WO 2007/077759 A1 | 7/2007 |
| WO | WO 2009/018391 | 2/2009 |
| WO | WO 2012/037139 | 3/2012 |

OTHER PUBLICATIONS

Oregon Scientific—ATC 9000, http:/www.helmkameras24.de/Oregon-Scientific-ATC-9000_c25 . . . , accessed Nov. 2, 2009, 2 pages.

Photograph and drawing of a Midland Radio goggle mount for a camera. The photograph was taken at the CES Trade Show, Jan. 2010.

Photograph and drawing of a Midland Radio goggle mount for a camera with a plug mount inserted into the goggle mount and a camera showing in the foreground. The photograph was taken at the CES Trade Show Jan. 2010.

Printout and drawing of subject matter from an Internet website: httpsllwww.midlandradio.comIResourceJProductl1390/Detail/LargeImage/Goggle%20Mou, Oct. 18, 2010.

Rainbow Guitar webpage for Dual Channel Camera mount Wireless Microphone available at http://www.rainbowguitars.com/live-sounds/audio-technical/atw-1823-dual-channel-camera-mount-wireless-system/ATW1823D/AT, date visited May 2, 2013.

Smarthome webpage for Remote Control Camera Pan Base Surveillance Camera Accessory available Mar. 23, 2009 at http://web.archive.org/web/20090323032932/http://www.smarthome.com/76006/Remote-Control-Camera-Pan-Base-Surveillance-Camera-Accessory/p.aspx, date visited May 2, 2013.

Sparkfun web page for Reed Switch available Aug. 30, 2009 at http://web.archive.org/web/20090831142518/http://www.sparkfun.com/commerce/product_info.php?products_id=8642, date visited May 2, 2013.

Webpage for Canon RC 5 Wireless Controller, available Aug. 5, 2010 at http://web.archive.org/web/20111210052722/http://www.amazon.com/Canon-RC-5-Wireless-Controller-Digital/dp/B00004WCCO, date visited May 2, 2013.

Webpage for E-Benk automatic pan tilt tripod with remote control, available May 22, 2009 at http:/web.archive.org/web/20121006050738/

(56) References Cited

OTHER PUBLICATIONS http://www.amazon.com/eBenk-Automatic-Tripod-Remote-Control/dp/B000KNMGR2, date visited May 2, 2013.
Webpage for Eye.fi, available May 9, 2009 at http://web.archive.org/web/20090509001848/http://www.eye.fi/cards/, date visited May 2, 2013.
Webpage for Mobile Air Mouse available Mar. 23, 2009 at http://web.archive.org/web/20090323060354/http://www.mobileairmouse.com/, date visited May 2, 2013.
Ex-Parte Kennedy, Appeal No. 2008-1131 (U.S. Appl. No. 10/080,999, BPAI Sep. 18, 2008), 9 pages.
Austrian Patent Office, Search and Opinion on Legal Validity, Aug. 3, 2010 (German language version and English translation).
English language machine translation of JP 08-223524 dated Aug. 30, 1996.
Examination Report No. 1 concerning corresponding Australian Pat. Appl. No. 2008282223 dated Sep. 14, 2012.
First Office Action dated Nov. 24, 2011 issued by the Chinese Patent Office for corresponding Chinese Patent Application No. 200880109237.6.
Second Office Action dated Jul. 20, 2012, issued by the Chinese Patent Office for corresponding Chinese Patent Application No. 200880109237.6.
Decision of Rejection dated Mar. 15, 2013, issued by the Chinese Patent Office for corresponding Chinese Patent Application No. 200880109237.6 (translation only).
Supplemental Search Report from the European Patent Office concerning related European Patent Application No. 08782542.8 dated Dec. 22, 2010.
Summons to attend oral hearings concerning corresponding European Pat. Appl. No. 08782542.8 dated Oct. 11, 2012.
Office Action in European Application No. 08782542.8 dated Apr. 3, 2019.
Office Action in European Application No. 08782542.8 dated Jul. 4, 2019.
Written Opinion in Singapore Application No. 20100010-4 dated May 13, 2011.
Written Opinion in Singapore Application No. 201203835-2 dated Jun. 27, 2014.
Office Action in Chinese Application No. 201610204483.6 dated Sep. 18, 2017.
Office Action in Chinese Application No. 201610204483.6 dated Feb. 5, 2018.
Second Office Action in Chinese Application No. 201610204483.6 dated Dec. 21, 2018.
Third Office Action in Chinese Application No. 201610204483.6 dated Aug. 5, 2019.
Fourth Office Action in Chinese Application No. 201610204483.6 dated Jun. 4, 2020.
Extended European Search Report in European Application No. 21192933.6 dated Dec. 8, 2021.
First Examination Report in European Application No. 21192933.6, dated Jul. 26, 2023, in 4 pages.

* cited by examiner

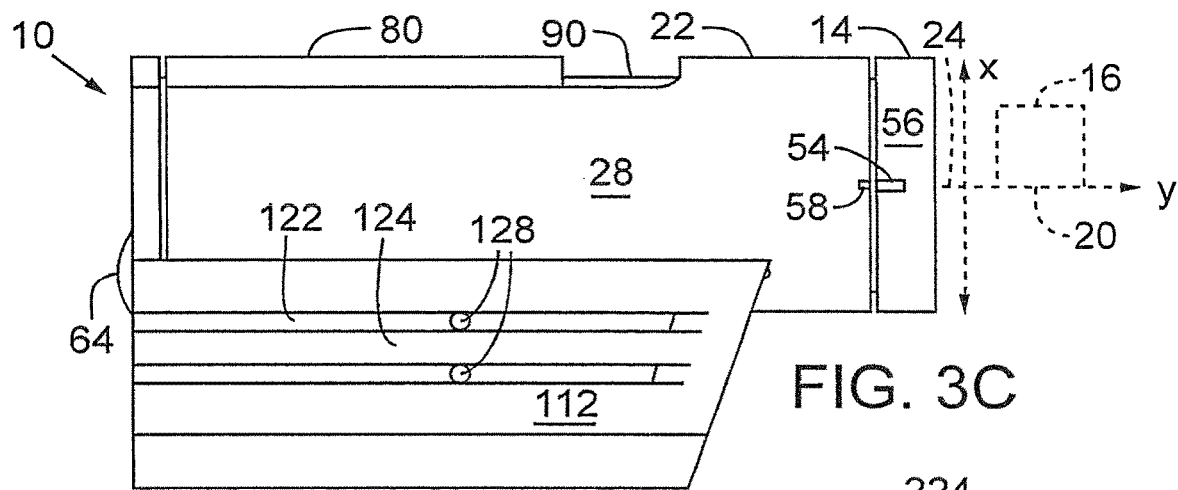
FIG. 3C
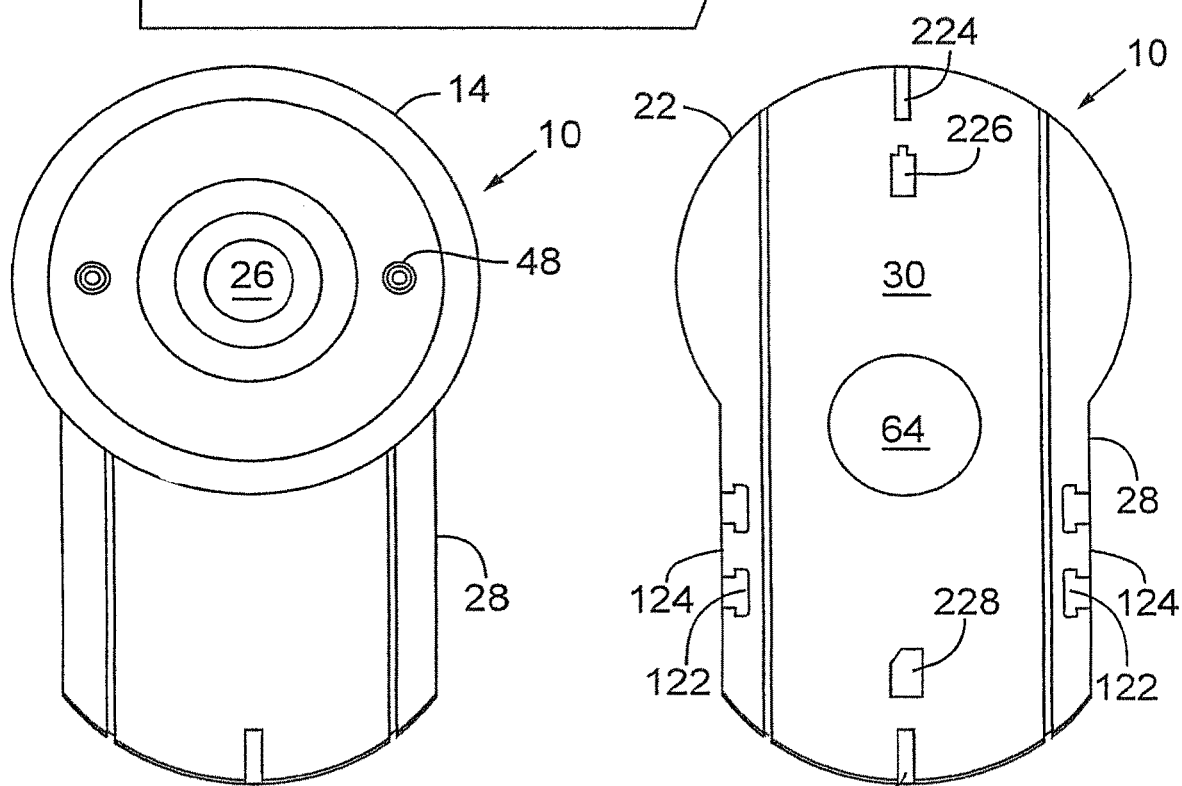
FIG. 3D
FIG. 3E
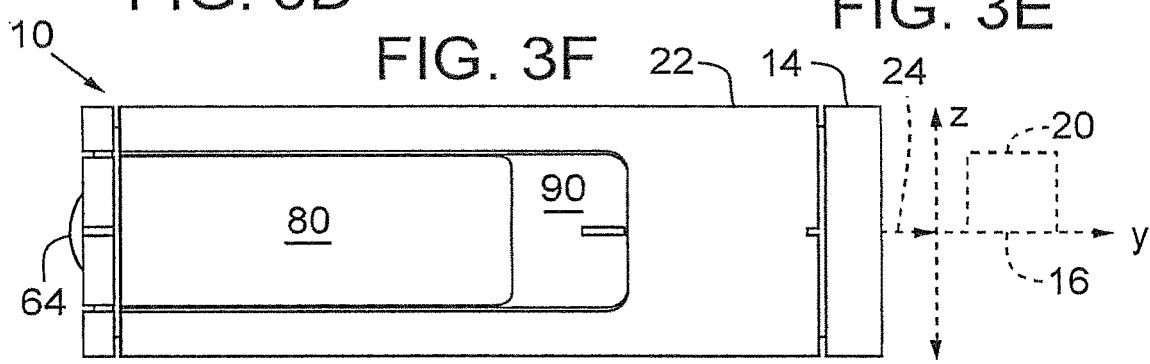
FIG. 3F

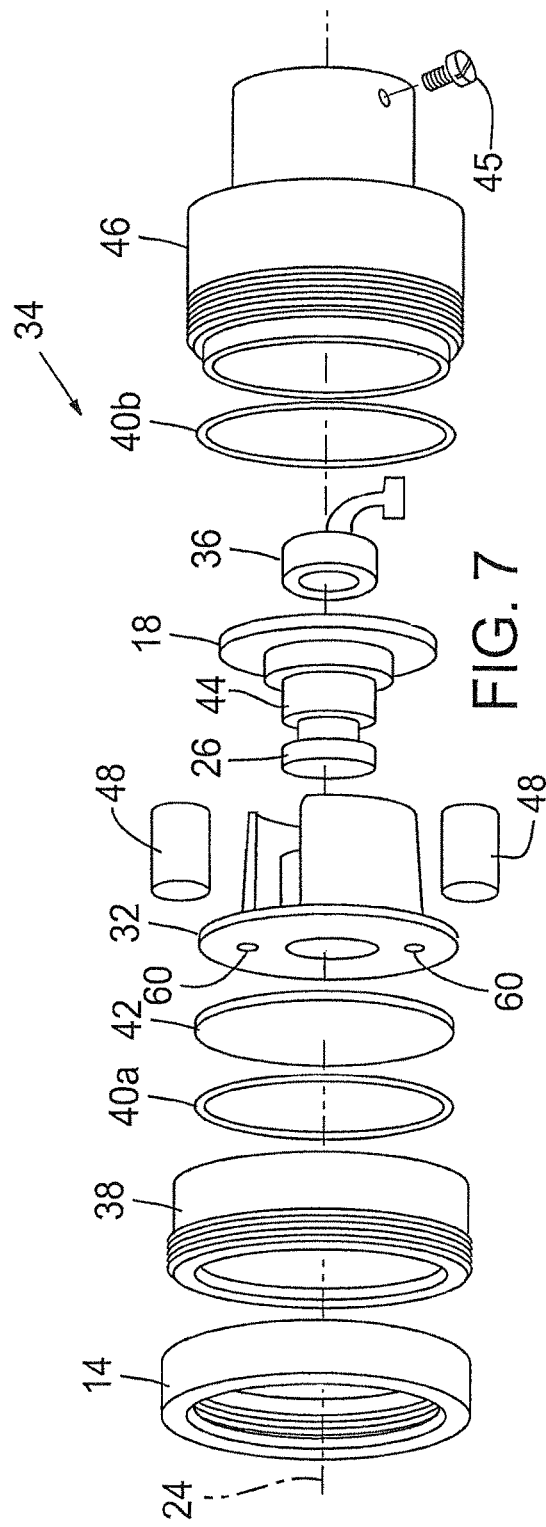
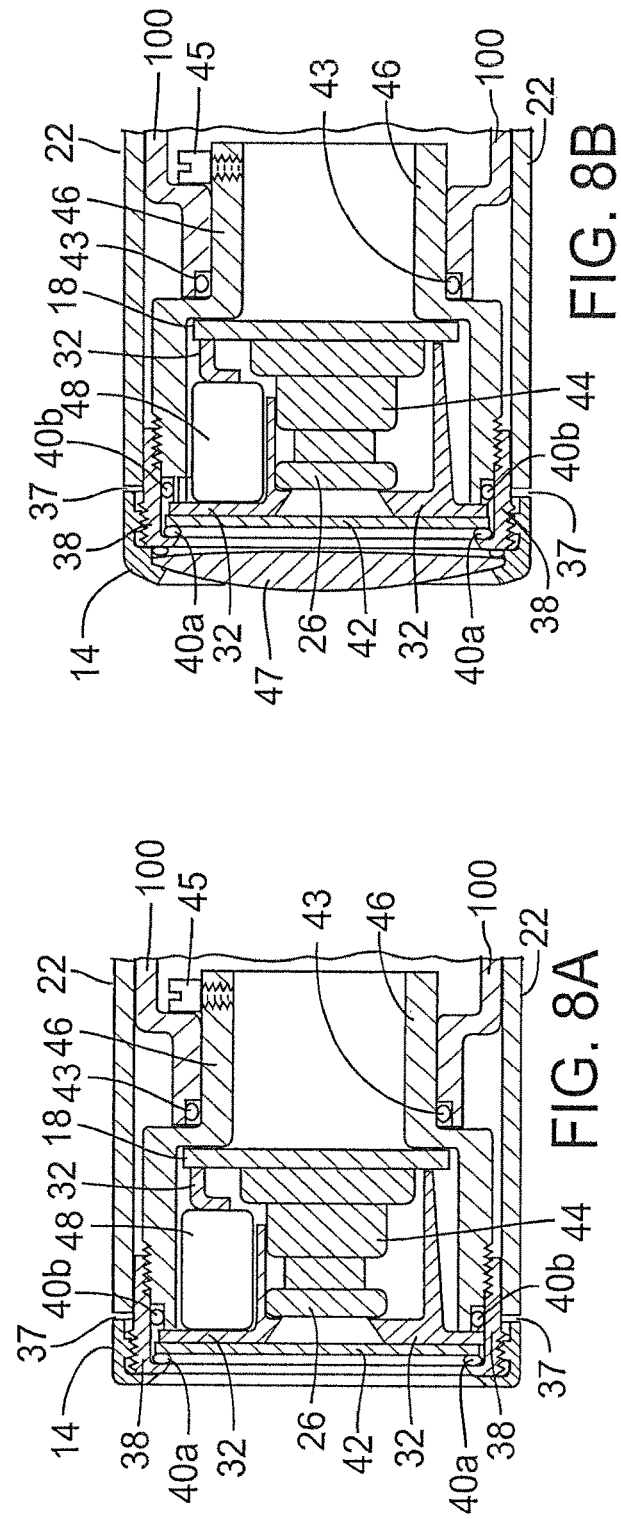

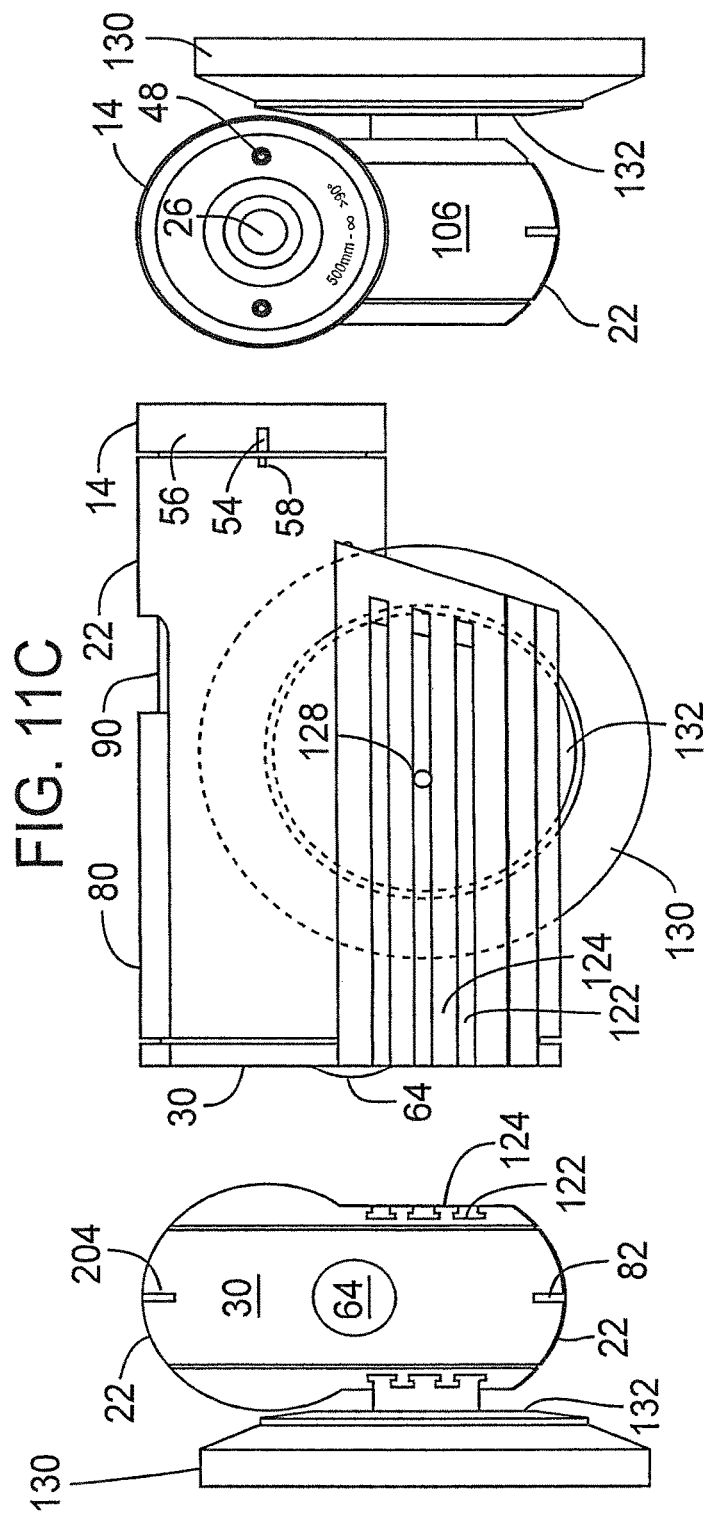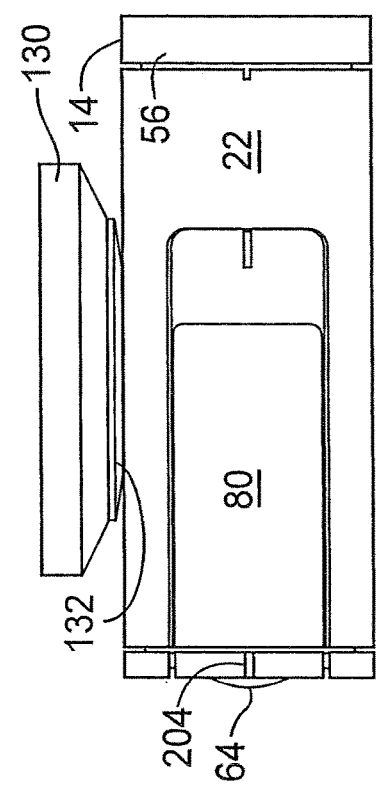

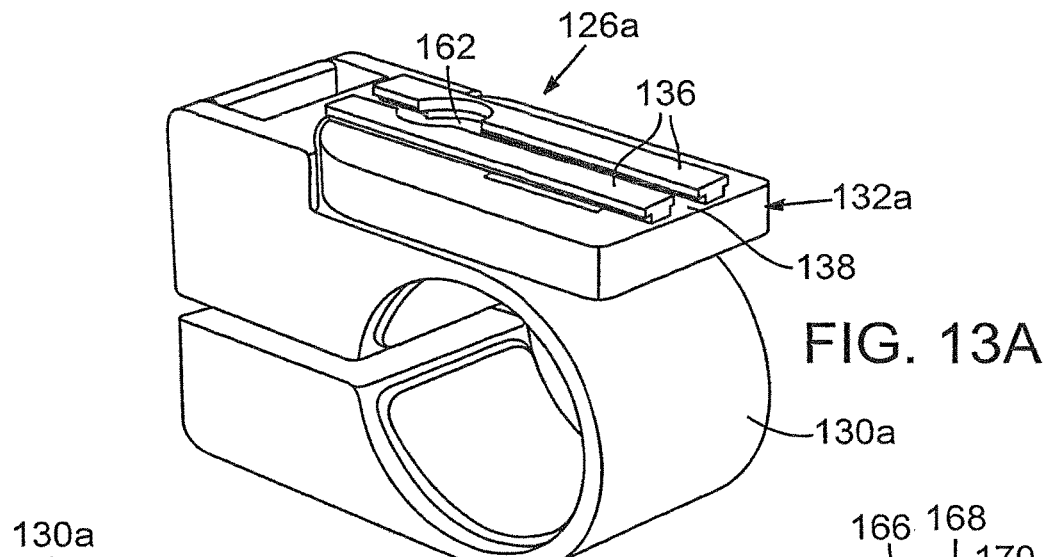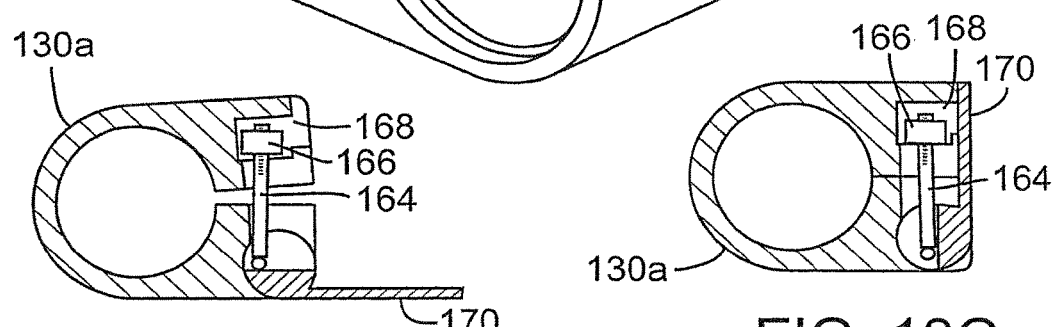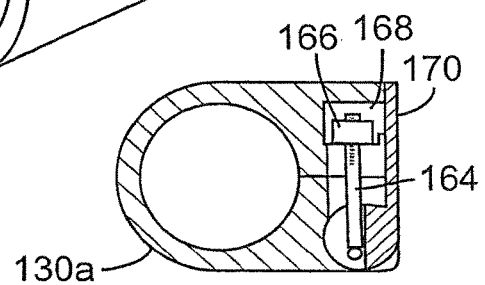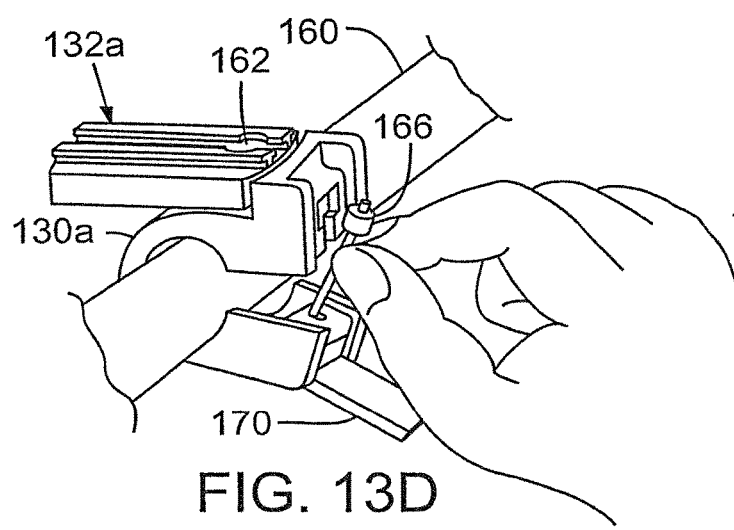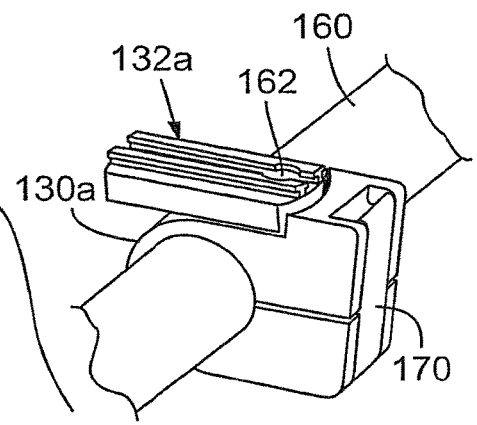
FIG. 13A
FIG. 13B
FIG. 13C
FIG. 13D
FIG. 13E

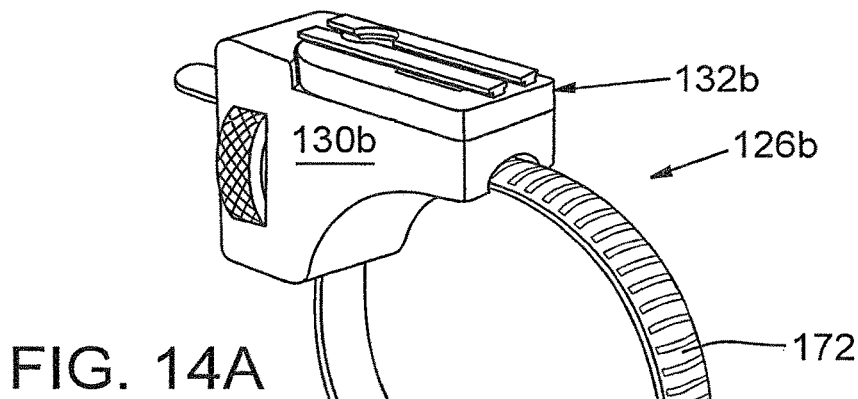
FIG. 14A
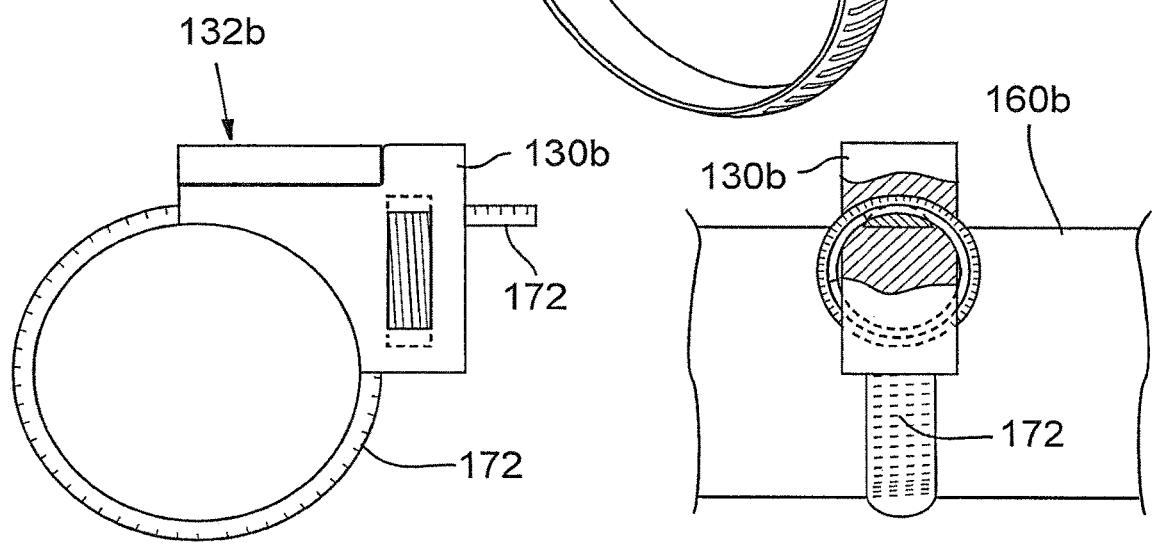
FIG. 14B
FIG. 14C
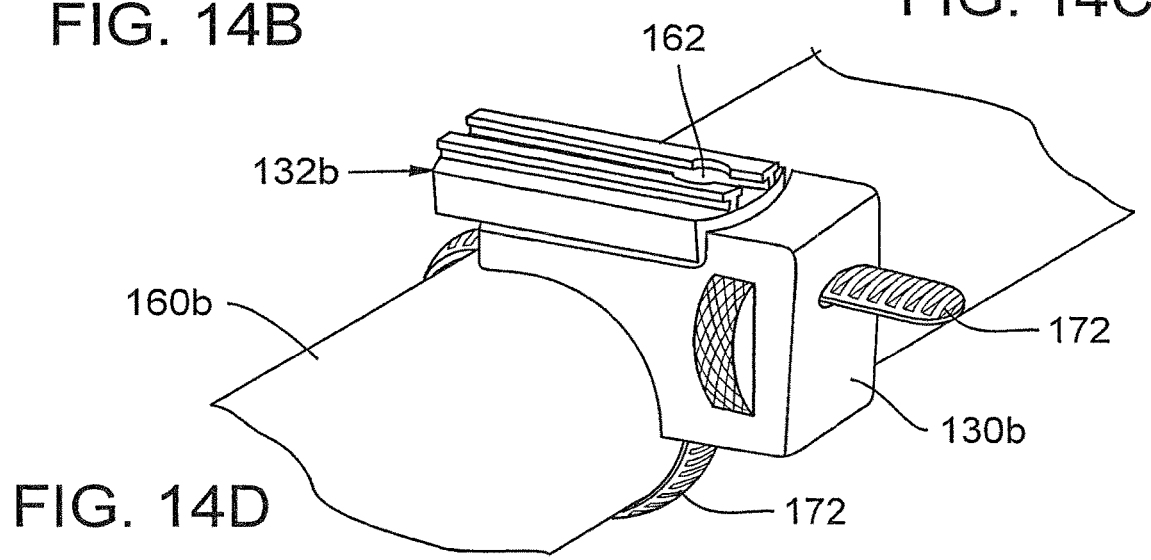
FIG. 14D

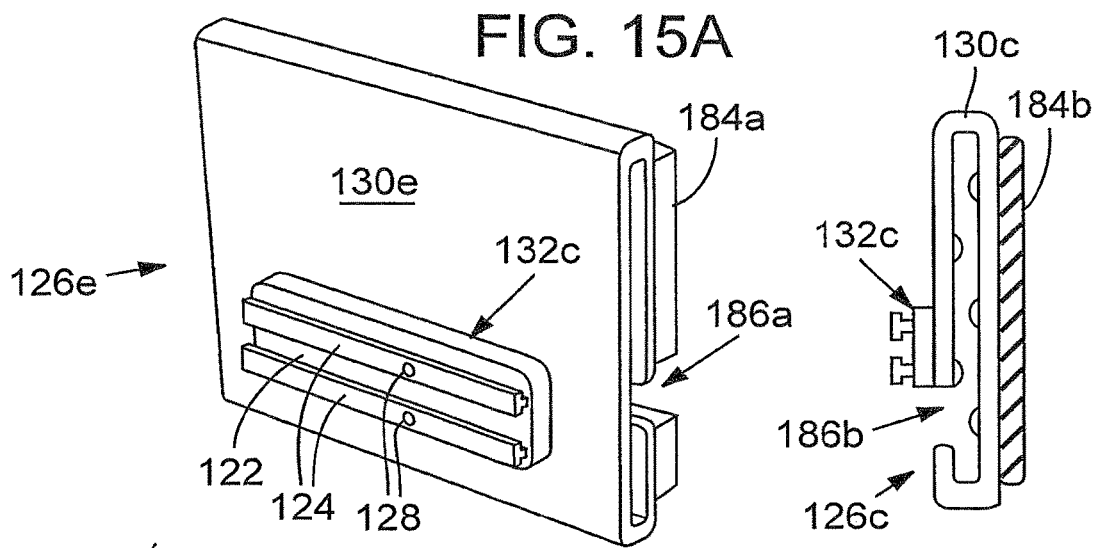
FIG. 15A
FIG. 15B
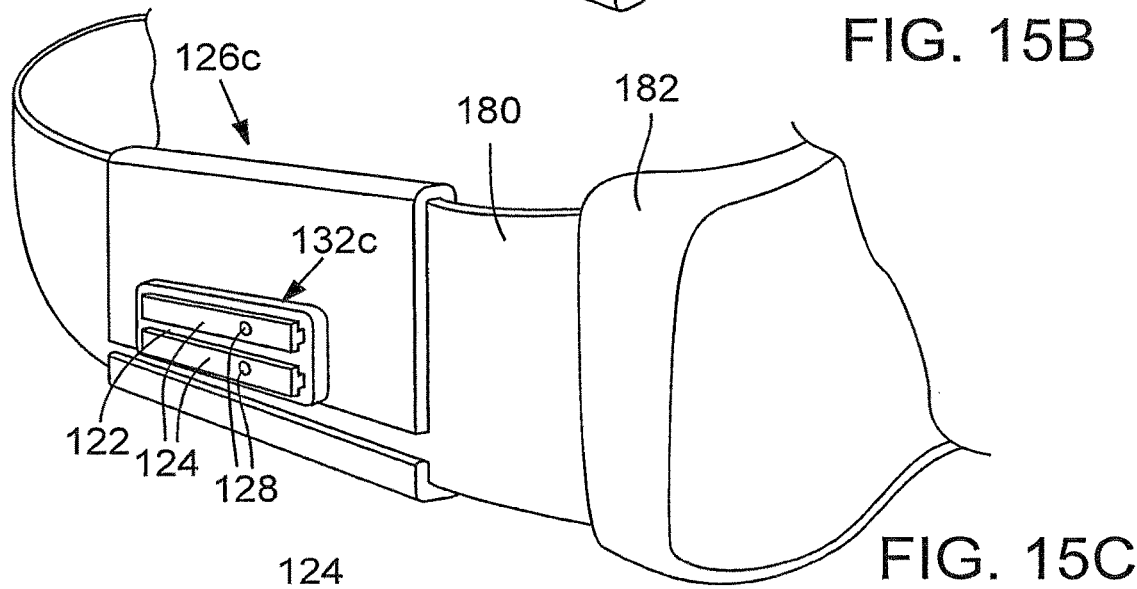
FIG. 15C
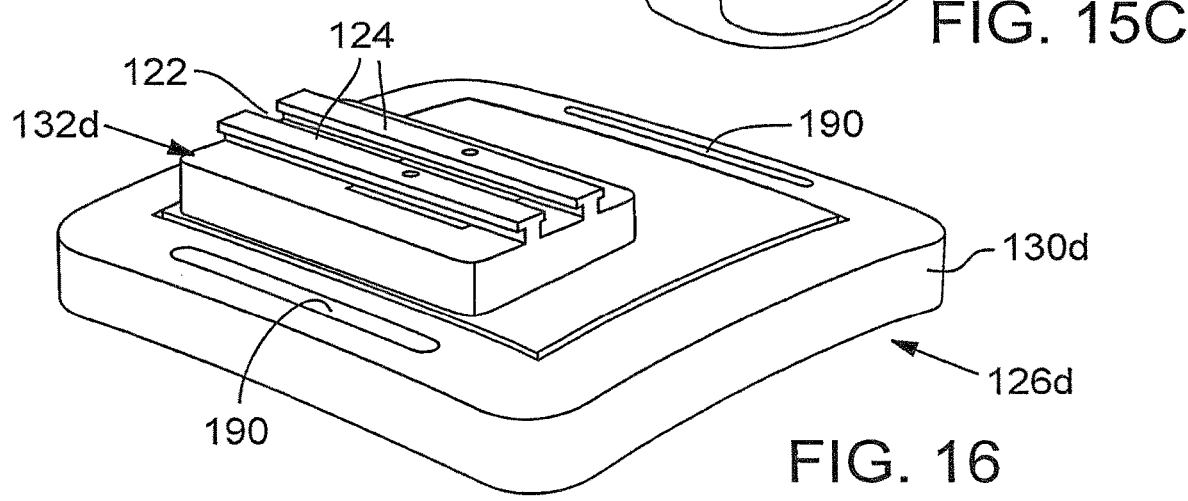
FIG. 16

IMAGE ORIENTATION CONTROL FOR A PORTABLE DIGITAL VIDEO CAMERA

CROSS REFERENCE TO RELATED APPLICATIONS

This application is a continuation of U.S. patent application Ser. No. 17/198,048, filed Mar. 10, 2021, entitled "IMAGE ORIENTATION CONTROL FOR A PORTABLE DIGITAL VIDEO CAMERA", which is a continuation of U.S. patent application Ser. No. 16/664,330, filed Oct. 25, 2019, entitled "IMAGE ORIENTATION CONTROL FOR A PORTABLE DIGITAL VIDEO CAMERA", which is a continuation of U.S. patent application Ser. No. 15/181,112, filed Jun. 13, 2016, entitled "IMAGE ORIENTATION CONTROL FOR A PORTABLE DIGITAL VIDEO CAMERA", which is a continuation of U.S. patent application Ser. No. 13/674,817, filed Nov. 12, 2012, "IMAGE ORIENTATION CONTROL FOR A PORTABLE DIGITAL VIDEO CAMERA", which is a divisional of U.S. patent application Ser. No. 12/671,442, filed May 14, 2010, "CONTROL SWITCH FOR A PORTABLE DIGITAL VIDEO CAMERA", which is a continuation-in-part of U.S. Design Application No. 29/322,219, filed Jul. 30, 2008, entitled "PORTABLE DIGITAL VIDEO CAMERA" and which is a U.S. national stage application of International Patent Application No. PCT/US2008/071661, filed Jul. 30, 2008, entitled "COMPONENTS OF A PORTABLE DIGITAL VIDEO CAMERA", which claims priority benefit to U.S. Provisional Patent Application No. 60/952,810, filed Jul. 30, 2007, entitled "MOBILE, WEARABLE DIGITAL VIDEO CAMERA", each of which is hereby incorporated herein by reference in its entirety.

BACKGROUND OF THE INVENTION

Technical Field

The field of invention relates to point-of-view (POV) video cameras or camcorders and, in particular, to an integrated hands-free, POV action sports video camera or camcorder.

Background Information

First-person video cameras are a relatively new product category that have been adapted to capture POV video by action sports enthusiasts in a hands-free manner. Conventional first-person video cameras primarily comprise a lens that must be tethered to a separate digital video recorder or camcorder. FIGS. 1A and 1B present pictorial views of prior art first-person video cameras requiring a tethered lens approach to capturing first-person video recording. FIG. 1A presents a Twenty20™ device, and FIG. 1B presents a Viosport™ device. FIGS. 1C and 1D present pictorial views of prior art video cameras tethered to camcorders for implementing the tethered lens approach to capturing first-person video recording. FIG. 1C and FIG. 1D present Samsung™ devices.

These products are not generally hands-free products, and consumers have been employing their own unique mounting techniques to permit "hands-free" video recording of action sports activities. FIG. 1E presents a pictorial view of a tethered camera attempting to facilitate hands-free POV video recording. FIG. 1E presents a Blackeye™ device. These recent devices attempt to convey image data from "tethered" cameras to separate camcorders through IR signals to eliminate the tethering cables.

More recently, integrated hands-free, POV action sports video cameras have become available. FIGS. 2A and 2B present pictorial views of two prior art products implementing integrated solutions to first-person video recording. These products are still in their infancy and may be difficult to use well.

SUMMARY OF THE INVENTION

A portable digital video camera (or camcorder) includes a camera housing and a lens.

Some embodiments of the portable digital video camera (or camcorder) comprise an integrated hands-free, POV action sports digital video camera (or camcorder).

Some embodiments of the portable digital video camera (or camcorder) or the integrated hands-free, POV action sports digital video camera (or camcorder) include an image sensor for capturing image data.

Some embodiments of the portable digital video camera (or camcorder) or the integrated hands-free, POV action sports digital video camera (or camcorder) include a manual horizon adjustment control for adjusting an orientation of a horizontal image plane recorded by the image sensor with respect to a housing plane of the camera housing.

Some embodiments of the portable digital video camera (or camcorder) or the integrated hands-free, POV action sports digital video camera (or camcorder) include a laser alignment system with one or more laser sources capable of projecting light emissions to define a horizontal projection axis that is coordinated with orientation of the horizontal image plane.

Some embodiments of the portable digital video camera (or camcorder) or the integrated hands-free, POV action sports digital video camera (or camcorder) include a microphone and a manually operable switch for controlling an audio and/or video data capturing operation, the switch having an activator that covers the microphone whenever the switch is in the OFF position.

Some embodiments of the portable digital video camera (or camcorder) or the integrated hands-free, POV action sports digital video camera (or camcorder) include a "quick-release" mounting system that can be used in conjunction with the laser alignment system to adjust the image capture orientation for pitch, yaw, and roll.

Additional aspects and advantages will be apparent from the following detailed description of preferred embodiments, which proceeds with reference to the accompanying drawings.

BRIEF DESCRIPTION OF THE DRAWINGS

FIGS. 3A, 3B, 3C, 3D, 3E, and 3F are, respectively, front perspective, back perspective, side elevation, front elevation, back elevation, and top plan views of an embodiment of an integrated hands-free, POV action sports digital video camera.

FIG. 7 is an exploded view of optical and mechanical components of an integrated hands-free, POV action sports digital video camera.

FIGS. 8A and 8B are fragmentary cross-sectional views of the lens system of the camera of FIG. 7, showing, respectively, a standard lens and the standard lens fitted with a lens filter.

FIGS. 11A, 11B, 11C, and 11D are, respectively, back elevation, front elevation, side elevation, and top plan views of the versatile mounting system, demonstrating the matable relationship between the camera of FIGS. 3A-3E with the standard mount shown in FIG. 10.

FIG. 13A is a front perspective view of a pole mount system, employing the mount of FIG. 12.

FIGS. 13B and 13C are cross-sectional side views of a pole mount system showing, respectively, unlocked and locked configurations.

FIGS. 13D and 13E are front perspective views of a pole mount system showing, respectively, unlocked and locked configurations about a handle bar.

FIG. 14A is a front perspective view of an alternative pole mount system, employing the mount of FIG. 12 and a strap.

FIGS. 14B and 14C are respective side and front views of the alternative pole mount of FIG. 14A.

FIG. 14D is a front perspective view of the alternative pole mount of FIG. 14A locked about a pole.

FIG. 15A is a front perspective view of a goggle mount, employing a strap entrance facing in the opposite direction of the mounting rails.

FIG. 15B is a side view of an alternative goggle mount, employing a strap entrance facing in the same direction of the mounting rails.

FIG. 15C is a fragmentary front perspective view of the alternative goggle mount of FIG. 1B mounted upon a goggle strap.

FIG. 16 is a front perspective view of a vented helmet mount, adapted for employing a strap for attachment to a vented helmet.

DETAILED DESCRIPTION OF THE PREFERRED EMBODIMENT

Figure 1A:
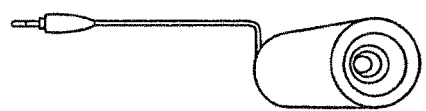
FIGS. 1A, 1B, 1C, 1D, and 1E constitute a set of pictorial views of four prior art products implementing a tethered lens approach to capturing first-person video recording.
Figure 1B:
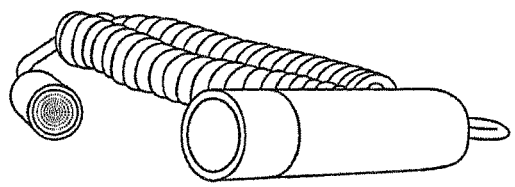
Figure 1C:
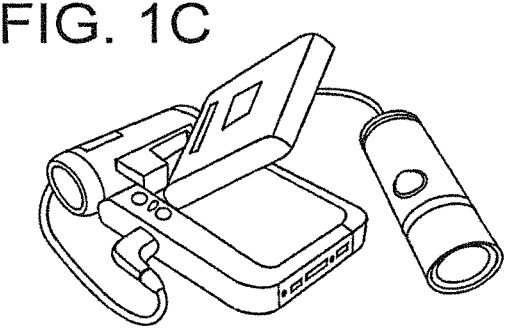
Figure 1D:
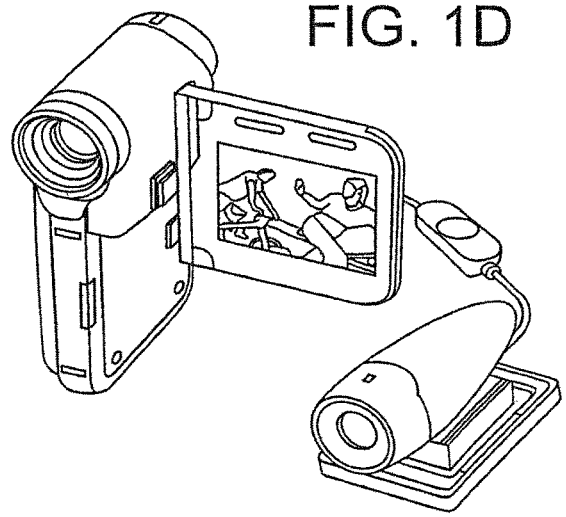
Figure 1E:
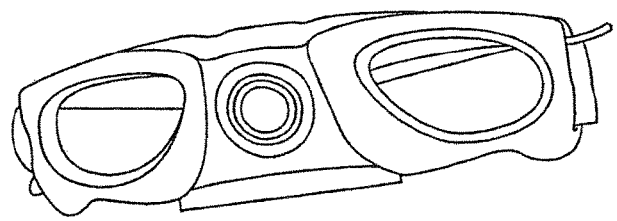
Figure 2A:
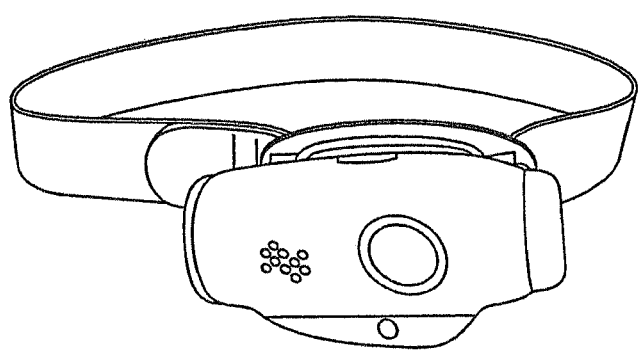
FIGS. 2A and 2B constitute a set of pictorial views of two prior art products implementing integrated solutions to first-person video recording.
Figure 2B:
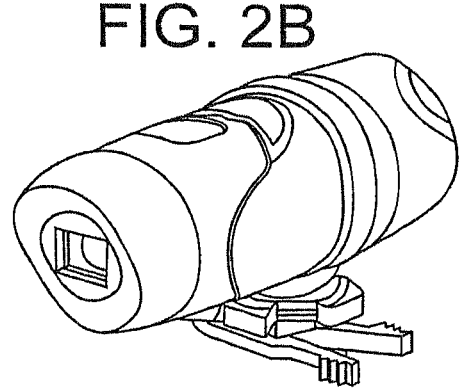
Figure 3A:
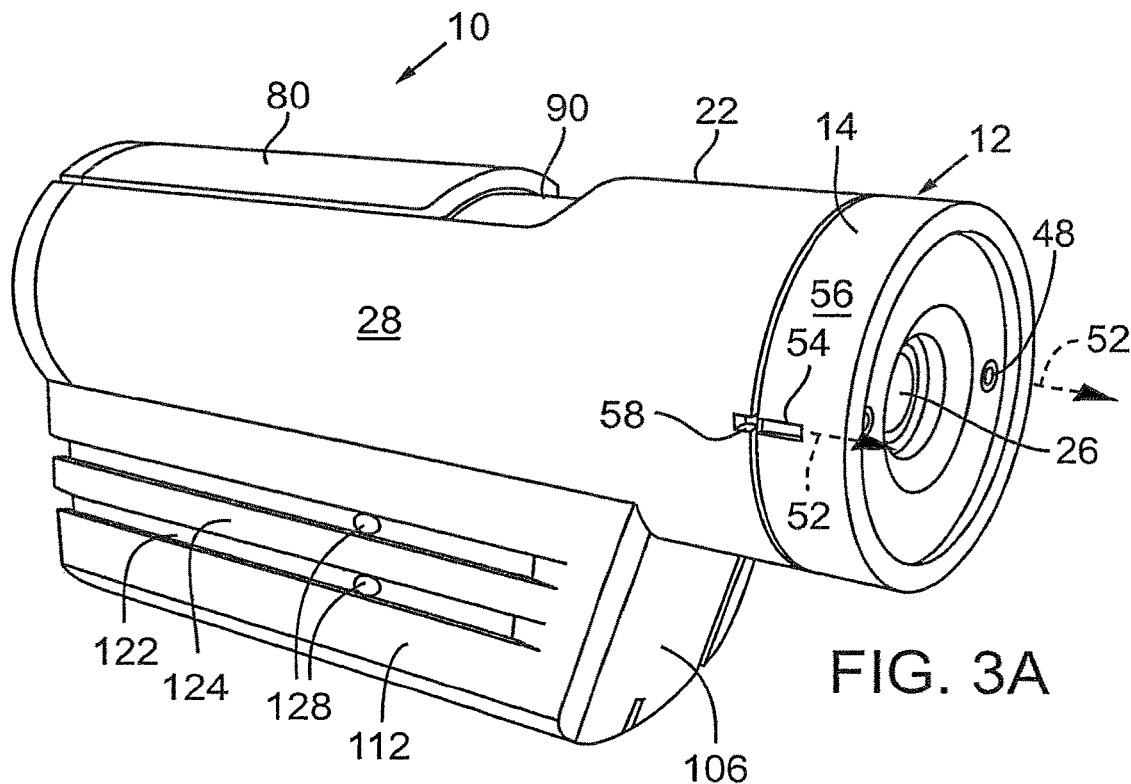
Figure 3B:
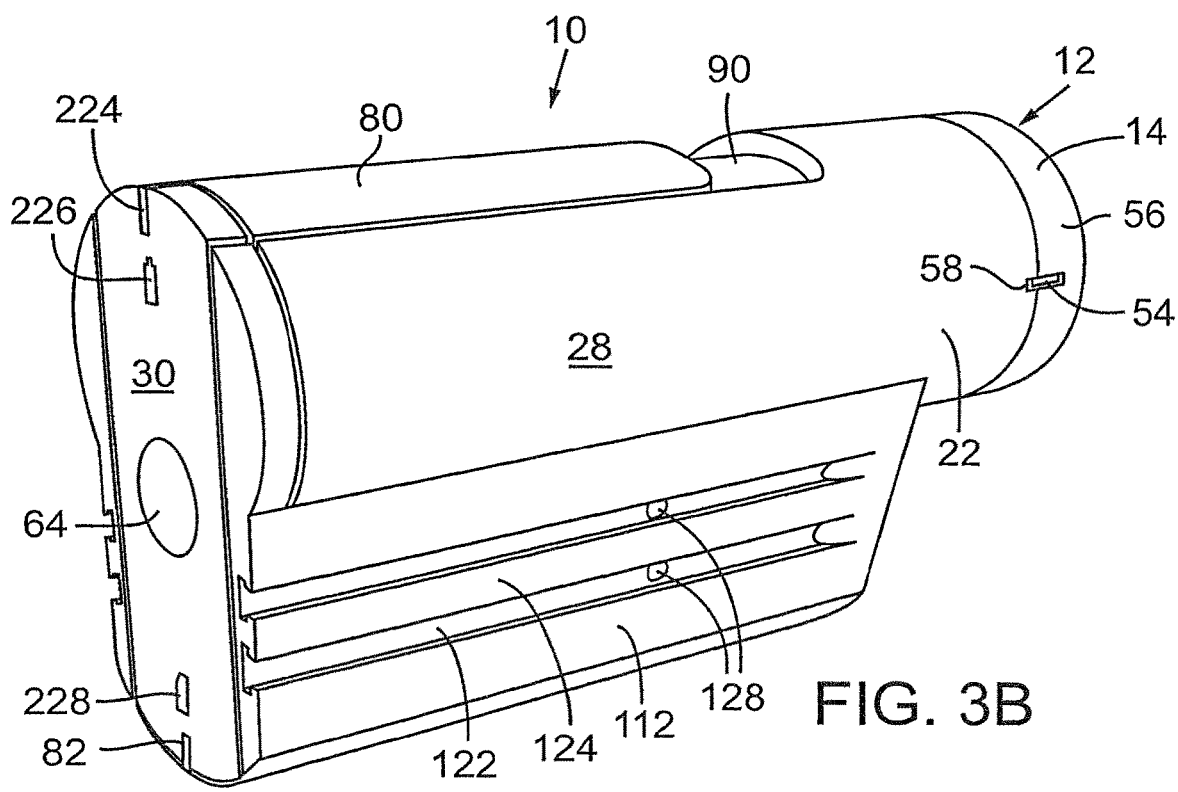
Figure 4A:
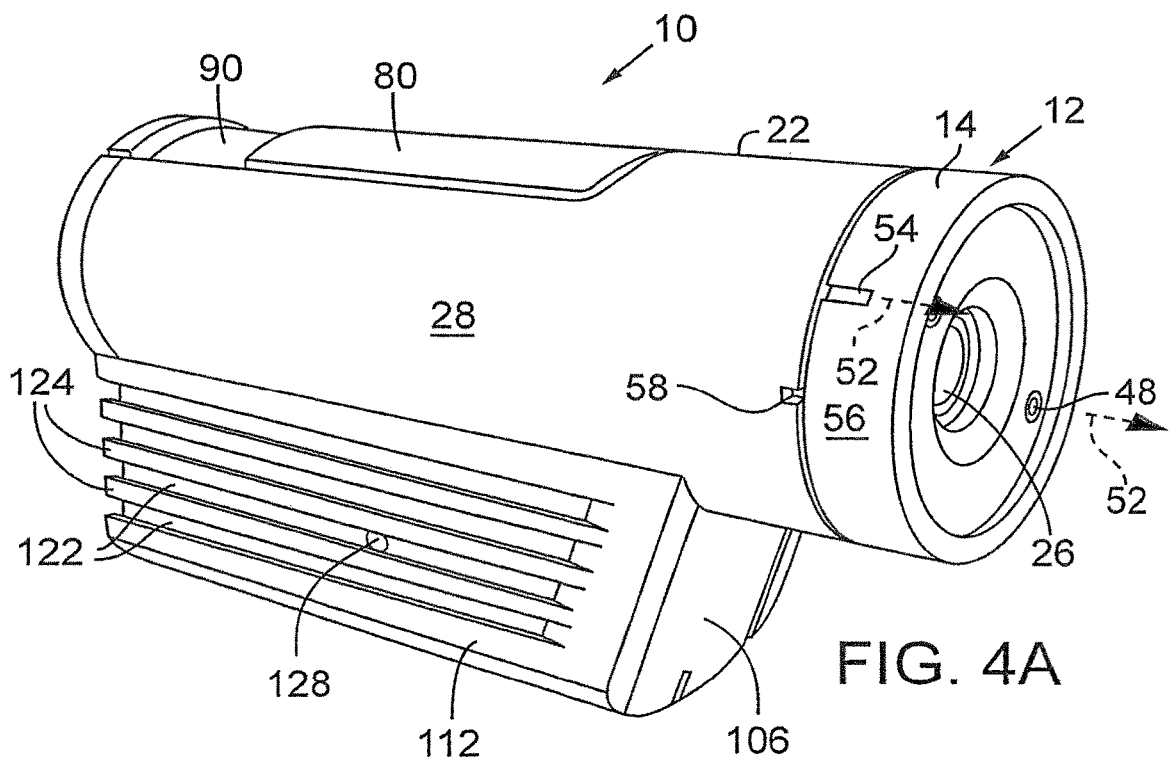
FIG. 4A is a front perspective view of an embodiment of an integrated hands-free, POV action sports digital video camera, showing alternative positioning of a switch and representative alternative rotation of a rotary horizontal adjustment controller.
Figure 4B:
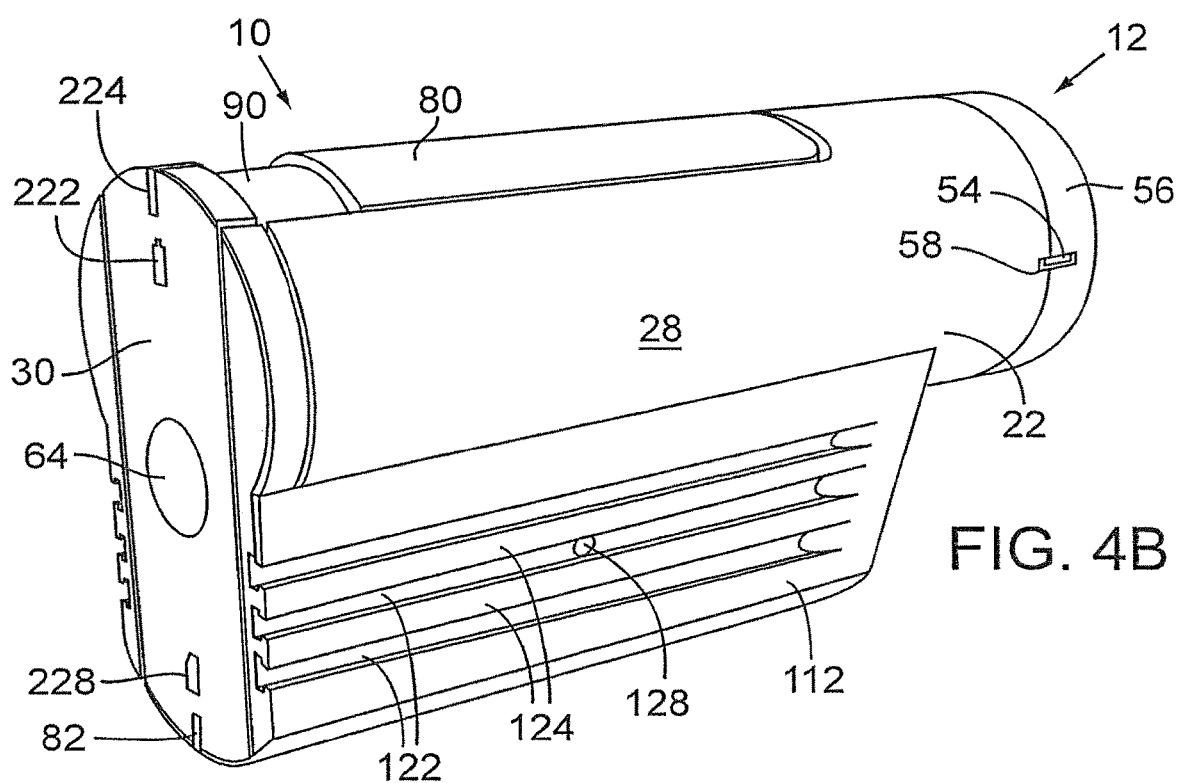
FIG. 4B is a back perspective view of an embodiment of an integrated hands-free, POV action sports digital video camera, showing a representative alternative number of rail cavities and an optional detent within a rail cavity.

FIGS. 3A, 3B, 3C, 3D, 3E, and 3F are, respectively, front perspective, back perspective, side elevation, front elevation, back elevation, and top plan views of an embodiment of an integrated hands-free, POV action sports digital video camera 10, and FIGS. 4A and 4B are front and back perspective views of, respectively, an alternative configuration and an alternative embodiment of the digital video camera 10. For purposes of this description, the term "camera" is intended to cover camcorder(s) as well as camera(s). An example of such a digital video camera 10 is included in the VholdR™ system, marketed by Twenty20, Inc., of Seattle, Washington.

FIGS. 5, 6, 7, 8A, and 8B show optical and mechanical components of the digital video camera 10. With reference to FIGS. 3A-3F, 4A, 4B, 5, 6, 7, 8A, and 8B, some embodiments of the digital video camera 10 include a manual horizon adjustment control system 12 including a manual horizon adjustment control for adjusting an orientation of a horizontal image plane 16 of an image recorded by an image sensor 18 with respect to a housing plane 20 (along a vertical cross-section) of a camera housing 22. An exemplary image sensor 18 may be CMOS image capture card, and provide for minimum illumination of 0.04 Lux @ f/1.2, offer high sensitivity for low-light operation, low fixed pattern noise, anti-blooming, zero smearing, and low power consumption.

With reference to FIGS. 3A, 3C, 3F, 4A, 6, and 7, in some embodiments, the manual horizon adjustment control is a rotary controller 14 that rotates about a control axis 24 such that manual rotation of the rotary controller 14 changes the orientation of the horizontal image plane 16 with respect to the housing plane 20. The manual horizon adjustment control can be used to offset the horizontal image plane 16 with respect to the pitch, yaw, and roll of the mounting position of the camera housing 22.

In some preferred embodiments, the rotary controller 14 is positioned about a lens 26 and cooperates with a lens shroud 32 to support the lens 26 within the camera housing 22 such that manual rotation of the rotary controller 14 rotates the lens 26 with respect to the camera housing 22. In other embodiments, the lens 26 may remain fixed with respect to the camera housing 22 even though the rotary controller 14 rotates around the lens 26. In some embodiments, the lens 26 is a 3.6 mm, ¼" 4G type, glass eye lens with a 90° viewing angle and a focal length covering a large range, such as from arm's length (e.g., 500 mm) to infinity, which focuses visual information onto the image sensor 18 at a resolution, such as at 640×480. Skilled persons will appreciate that a variety of types and sizes of suitable lenses are commercially available.

In some preferred embodiments, the image sensor 18 is supported in rotational congruence with the orientation of the rotary controller 14 such that manual rotation of the rotary controller 14 rotates the image sensor 18 with respect to the housing plane 20 of the camera housing 22. When the image sensor 18 has a fixed relationship with the orientation of the rotary controller 14, the image data captured by image sensor 18 does not require any post capture horizon adjustment processing to obtain play back of the image data with a desired horizontal image plane 16. In particular, the rotary controller 14 can be set to a desired horizontal image plane 16, and the image sensor 18 will capture the image data with respect to the orientation of the horizontal image plane 16. In some embodiments, the image sensor 18 may remain fixed with respect to the camera housing 22 even though the rotary controller rotates around the image sensor 18.

With reference to FIGS. 6, 7, 8A, and 8B, in some embodiments, an exemplary optical assembly 34 shows how the image sensor 18 and the lens 26 may be supported in rotational congruence by the cooperation of the lens shroud 32, an internal rotation controller 36, and the rotary controller 14. In some preferred embodiments, the rotary controller 14 may be separated from the camera housing 22 by a gap 37 to facilitate the rotation of the rotary controller 14 with respect to the camera housing 22.

A lens cap holder 38 may be secured to the rotary controller 14 by screw threads and cooperates with an O-ring 40a and to provide support for a lens cover 42 (such as a piece of glass). A lens holder 44 and a lens assembly holder 46 may also be employed to support the lens 26 in a desired position with respect to the other components in the optical assembly 34. The lens assembly holder 46 may be secured to the lens cap holder 38 by screw threads and an O-ring 40b. An O-ring or bearings 43 may be employed between the lens assembly holder 46 and the main housing 100 to facilitate the rotation of the lens assembly holder 46 about the control axis 24 with respect to the main housing 100. A set screw 45 may be employed to secure the lens assembly holder 46 of optical assembly 34 to the main housing 100 without impeding the rotation of the lens assembly holder 46 or the components within it. In some embodiments, the rotary controller 14, the lens cap holder 38, the O-ring 40a, the lens cover 42, the lens shroud 32, the laser sources 48, the lens 26, the lens holder 44, the image sensor 18, the internal rotation controller 36, the O-ring 40b, and the lens assembly holder 46 of optical assembly 34 may rotate together. Skilled persons will appreciate that several of these components may be fixed with respect to the camera housing 22 or their synchronized rotation may be relaxed. For example, the lens cover 42, the lens 26, and the lens holder 44 need not rotate.

With reference to FIG. 8B, the rotary controller 14 may support a lens filter or other lens component, or the rotary controller may include screw threads or other means to enable attachment of additional or alternative lens components.

In some embodiments, the rotary controller 14 cooperates with an encoder to orient the image sensor 18 to the desired horizontal image plane 16. Alternatively, the encoder could guide post capture horizon adjustment processing to adjust the horizontal image plane 16 of the captured image so that it is transformed to play back the image data with the encoded horizontal image plane 16.

In some embodiments, the rotary controller 14 is positioned in an arbitrary location away from the lens 26 and/or in an arbitrary relationship with the position of the image sensor 18. In one example, the rotary controller 14 may be positioned on a side 28 of the camera housing 22 or a back door 30 and may remotely control the orientation of the image sensor 18 or may control an encoder. Skilled persons will appreciate that an arbitrarily located manual horizon adjustment control need not be a rotary and may be electronic instead of mechanical.

In some embodiments, the rotary controller 14 provides greater than or equal to 180 degree rotation of the horizontal image plane 16 with respect to the housing plane 20 of the camera housing 22 in each of the clockwise and counterclockwise directions. In one example, the rotary controller provides 180 degrees plus greater than or equal to six degrees of additional rotation in each direction, providing a 192-degree rotation of the horizontal image plane 16 with respect to the housing plane 20. This adjustability includes embodiments in which the orientation of the rotary controller 14 is in congruence with the orientation of the image sensor 18 as well as embodiments employing an encoder. Preferably, both the lens 26 and the image sensor 18 rotate together 192 degrees within a pivoting hermetically sealed capsule. This means no matter how an operator mounts the digital video camera 10, the image sensor 18 can be rotated to capture a level world.

With reference to FIGS. 4A and 4B, in some embodiments, a rotation indicator 54 is provided on an exterior surface 56 of the rotary controller 14. The rotation indicator 54 may take the form of a horizontal notch or raised bar that may or may not be colored differently from the color of camera housing 22. The camera housing 22 may have a similar or smaller notch or raised bar 58 of the same or different color that is fixed in one position. The dislocation between the rotation indicator 54 and the horizontal notch 58 provides a physical indication of the amount that the rotary controller 14 is displaced from its "home" position with respect to the camera housing 22.

In some preferred embodiments, the rotation indicator 54 and the horizontal notch 58 are in a collinear alignment (in the "home" position) when the horizontal image plane 16 is perpendicular to the housing plane 20. Thus, if the digital video camera 10 were set on a level horizontal surface and the two notches were collinear, the horizontal image plane would be horizontal.

With reference to FIGS. 3A, 3C, 3D, 3F, 4A, 7, and 8 in preferred embodiments, one or more laser sources 48 are fitted within the rotary controller 14, are oriented with the horizontal image plane 16, and are capable of projecting light emission(s) to define a horizontal projection axis or plane 52 that is parallel with or coplanar with the horizontal image plane 16. Thus, manual rotation of the rotary controller 14 changes the orientation of the horizontal projection axis 52 with respect to the housing plane 20 as the orientation of the horizontal image plane 16 is changed with respect to the horizontal projection axis 52. The beam(s) of light forming the horizontal projection axis 52 can be used as a guide by an operator to facilitate adjustment of the horizontal image plane 16 by simple rotation of the rotary controller 14 after the camera housing 22 has been mounted.

In some embodiments, a single laser source 48 may employ beam shaping optics and or a beam shaping aperture, filter, or film to provide a desired beam shape such as a line, lines of decreasing or increasing size, or a smiley face. In some embodiments, only a single beam shape is provided. In some embodiments, multiple beam shapes are provided and can be exchanged such as through manual or electronic rotation of a laser filter. Skilled persons will appreciate that two or more laser sources 48 may be outfitted with beam shaping capabilities that cooperate with each other to provide the horizontal projection axis 52 or an image that provides the horizontal projection axis 52 or other guidance tool.

In some embodiments, two laser sources 48 (or two groups of laser sources) are employed to project two beams of light that determine the horizontal projection axis 52. The two laser sources 48 may be mounted on opposite sides of the lens 26 such that their positions determine a laser mounting axis that bisects the lens 26. In some embodiments, the lens shroud 32 provides support for laser sources 48 such that they are positioned to emit light through apertures 60 in the lens shroud 32 (FIG. 7). In some embodiments, an alternative or additional optical support barrel 32a may support the laser source 48 and the other optical components.

The laser sources 48 may be diode lasers that are similar to those used in laser pointers. The laser sources 48 preferably project the same wavelength(s) of light. In some embodiments, an operator may select between a few different wavelengths, such as for red or green, depending on contrast with the background colors. In some embodiments, two wavelengths may be projected simultaneously or alternately. For example, four laser sources may be employed with red and green laser sources 48 positioned on each side of lens 26 such that red and green horizontal projections axes 52 are projected simultaneously or alternately in the event that one of the colors does not contrast with the background.

In some embodiments, the laser sources 48 may be responsive to a power switch or button 64, which in some examples may be located on the back door 30 of the camera housing 22. A rotation of horizon adjustment control system 12 or the rotary controller 14 may provide the laser sources 48 with an ON condition responsive to a timer, which may be preset such as for five seconds or may be a user selectable time period. Alternatively, a single press of the button 64 may provide the laser sources 48 with an ON condition with a second press providing an OFF condition. Alternatively, a single press of the button 64 may provide an ON condition responsive to a timer, which may be preset such as for five seconds or may be a user selectable time period. Alternatively, the button 64 may require continuous pressure to maintain the laser sources 48 in an ON condition. The button 64 may also control other functions such as standby mode. Skilled persons will appreciate that many variations are possible and are well within the domain of skilled practitioners.

Skilled persons will also appreciate that any type of video screen, such as those common to conventional camcorders, may be connected to or be a part of camera housing 22. Such video screen and any associated touch display may also be used as feedback for orientation in conjunction with or separately from the laser sources 48. Skilled persons will appreciate that the video screen may take the form of a micro-display mounted internally to the camera housing 22 with a viewing window to the screen through the camera housing 22 or may take the form of an external LCD screen.

With reference to FIGS. 3A, 3*b*, 3C, 3F, 4A, 4B, 5, and 6, in preferred embodiments, the digital video camera 10 has a manually operable switch activator 80 that controls the recording condition of the image sensor 18 and/or conveyance of the acquired image data to a data storage medium, such as on a two-gigabyte MicroSD card. In some embodiments, the digital video camera 10 is designed to use pulse power to conserve battery life while monitoring the switch activator 80. When the switch activator 80 is positioned to the ON position, the pulse power system is instructed to provide full power to the electronics and begin recording immediately; similarly, when the switch activator 80 is positioned to the OFF position, the pulse power system is instructed to cut power to the electronics and stop recording immediately.

In some preferred embodiments, when the switch activator 80 is slid or toggled, it moves a magnetic reed that is recognized from an impulse power sensor. Once the sensor recognizes the magnetic reed has been toggled to the ON position, the pulse power system is then triggered to power up most or all of the electronics of the digital video camera 10, including all of the electronics required for recording as well as selected other electronics or simply all the electronics. Once full power is provided to the system electronics, a feed from the image sensor 18 begins encoding and writing to the data storage medium. As soon as the first frames are written to the data storage medium, a signal is sent to an LED 82 to indicate via a light pipe 84 that the digital video camera 10 is recording. Thus, activation of the switch activator 80 initiates recording nearly instantaneously.

In some embodiments, the switch activator 80 powers up the electronics and initiates recording from a standby mode such as after the button 64 has been pushed to activate the pulse power mode. In other embodiments, the switch activator 80 powers up the electronics and initiates recording directly without any pre-activation. In some embodiments, a video encoder that cooperates with the image sensor and a microprocessor provides instructions to the video encoder. In some embodiments, the switch activator 80 is adapted to substantially simultaneously control supply of power to the microprocessor, the image sensor, and the video encoder, such that when the switch activator 80 is placed in the ON position the microprocessor, the image sensor, and the video encoder all receive power substantially concurrently and thereby substantially instantaneously initiate a video data capturing operation.

In some embodiments, an audio encoder cooperates with the microphone 90, and the microprocessor provides instructions to the audio encoder. In some embodiments, the switch activator 80 is adapted to substantially simultaneously control the supply of power to the microphone 90 and the audio encoder such that when the switch activator 80 is placed in the ON position, the microprocessor, the microphone, and the audio encoder all receive power substantially concurrently and thereby substantially instantaneously initiate an audio data capturing operation.

In some embodiments, when the switch activator 80 is placed in the OFF position, the microprocessor, the image sensor, and the video encoder all cease to receive power substantially concurrently and thereby substantially instantaneously cease the video data capturing operation. In some embodiments, when the switch activator 80 is placed in the OFF position, the microprocessor, the microphone 90, and the audio encoder all cease to receive power substantially concurrently and thereby substantially instantaneously cease the audio data capturing operation.

In some embodiments, the microprocessor, the image sensor 18, the video encoder, the microphone 90, and the audio encoder all receive power substantially concurrently and thereby substantially instantaneously initiate the video data and audio data capturing operations. In some embodiments, the microprocessor, the image sensor 18, the video encoder, the microphone 90, and the audio encoder all cease to receive power substantially concurrently and thereby substantially instantaneously cease the video data and audio data capturing operations.

In some embodiments, the switch activator 80 controls supply of power to additional electronics such that the additional electronics are deactivated when the switch activator 80 is in the OFF position and such that the additional electronics are activated when the switch activator 80 is in the ON position.

Skilled persons will appreciate that the switch activator 80 may be designed to have more than two slide settings. For example, in addition to ON and OFF settings for recording, switch activator 80 may provide an intermediate setting to activate laser sources 48, to activate one or more status indicators, or initiate other functions in the digital video camera 10.

The use of a magnetic reed switch as an embodiment for the switch activator 80 prevents water or other fluids from entering through the camera housing 22. Skilled persons will appreciate that other waterproof ON/OFF switch designs are possible. In preferred embodiments, digital video camera 10 also employs a waterproof microphone 90, such as an omni-directional microphone with a sensitivity (0 dB=1V/Pa, 1 KHz) of −44±2 dB and a frequency range of 100-10, 000 Hz, for capturing audio data and providing it to the data storage medium or to a second data storage medium. Alternatively, the camera housing 22 may include breathable, watertight materials (such as GoreTex™) to prevent the egress of water without requiring a waterproof microphone 90. Skilled persons will appreciate that microphones 90 with a large variety of operational parameters are commercially available or can be manufactured to suit desired criteria.

In some embodiments, the microphone 90 is positioned beneath the switch activator 80 such that the switch activator 80 covers the microphone 90 whenever the switch activator 80 is in the OFF position and such that the switch activator 80 exposes the microphone 90 whenever the switch activator 80 is in the ON position. The audio data capturing operation is preferably deactivated when the switch activator 80 is in the OFF position and that the audio data capturing operation is preferably activated when the switch activator 80 is in the ON position. The ON and OFF conditions of the audio data capturing operation may be controlled by the switch activator 80 in conjunction with the ON and OFF conditions of the video capturing operation.

Figure 5:
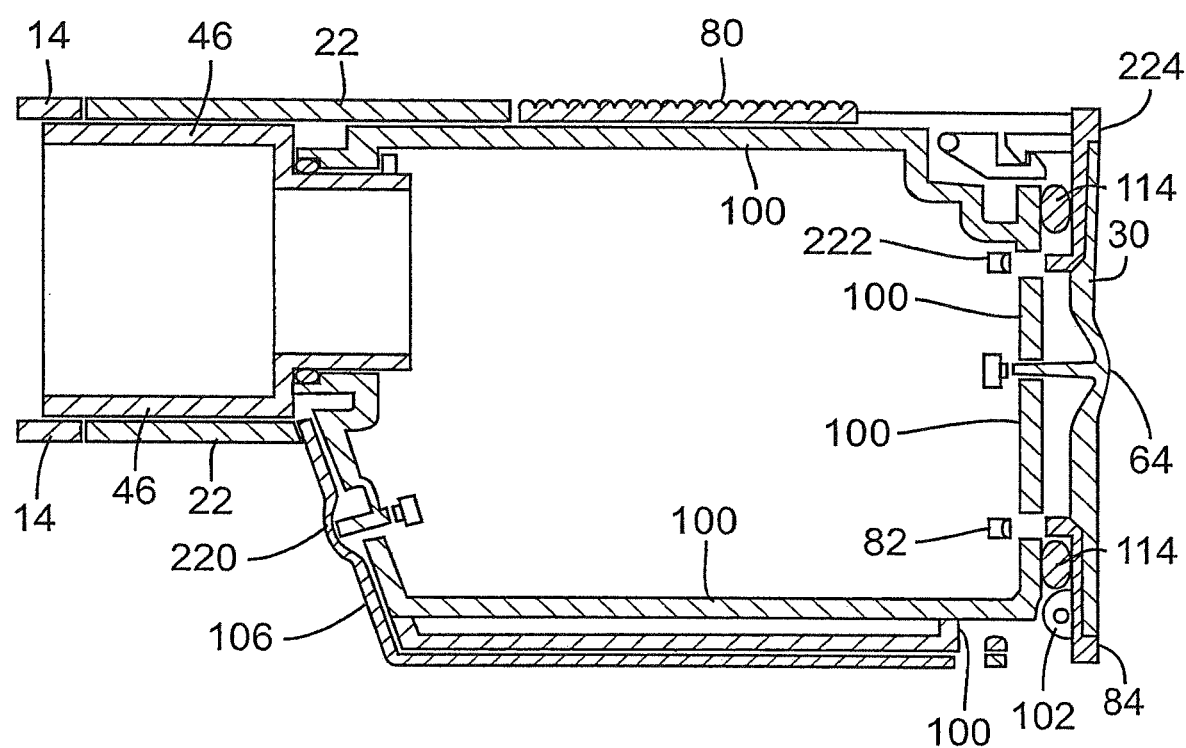
FIG. 5 is a cross-sectional side view of an embodiment of an integrated hands-free, POV action sports digital video camera.
Figure 6:
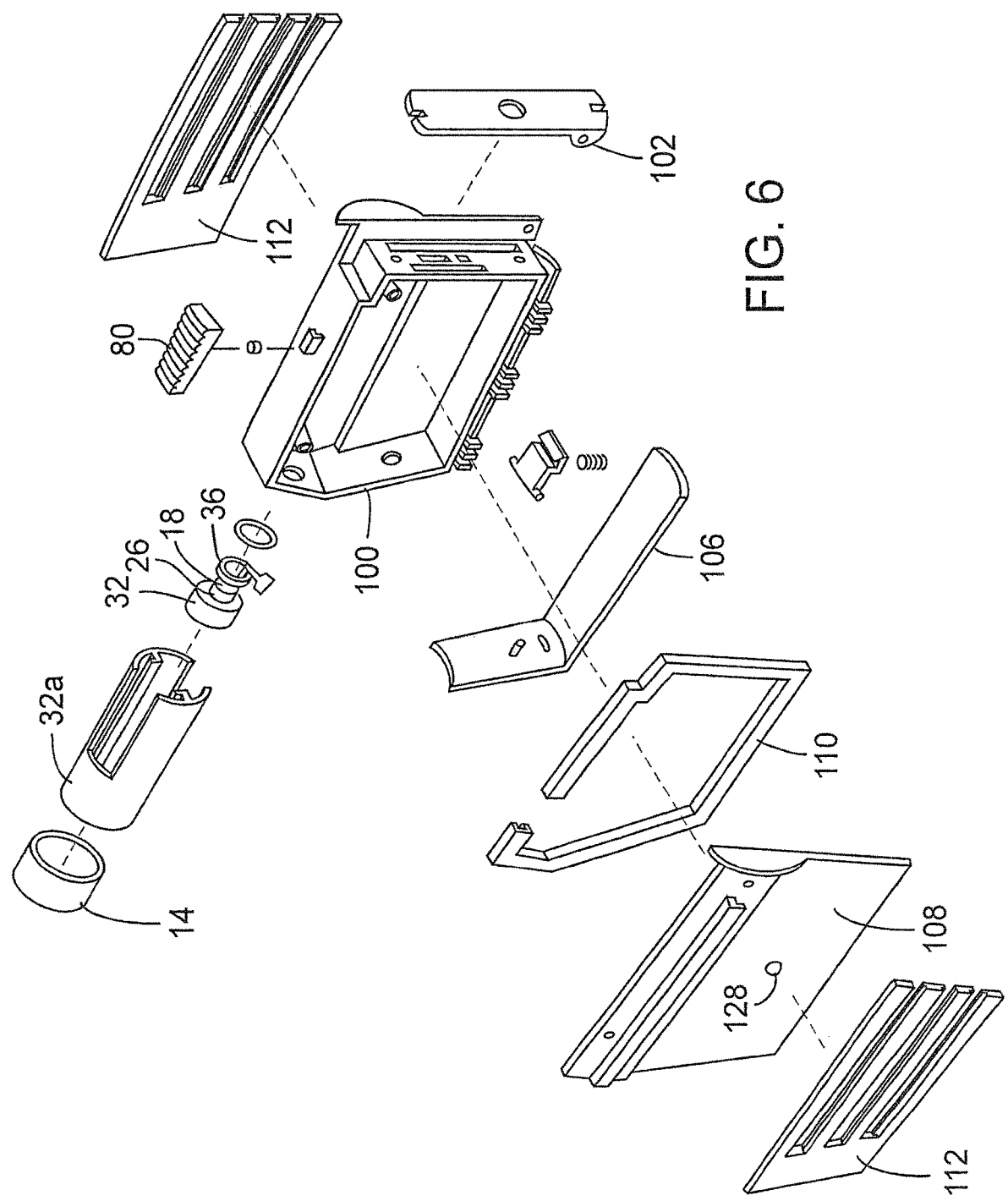
FIG. 6 is an exploded view of an embodiment of mechanical components of an integrated hands-free, POV action sports digital video camera.

With reference to FIGS. 5 and 6, in some embodiments, the camera housing 22 includes a main housing 100 that supports the switch activator 80, a front and bottom trim piece 106, and the back door 30 which is connected to the main housing 100 through a hinge 102. In some embodiments, the back door 30 may be removable through its hinge 102 to allow connection of accessories to the main housing 100 for extended functionality. The back door 30 may provide an area of thinner material to permit compression of the button 64. Gaskets 114 may be seated between the main housing 100 and the back door 30 to provide waterproofing. A housing cover 108 may be connected to the main housing 100 through a rubber gasket 110 that also enhances the waterproof characteristics of the camera housing 22.

Side caps 112 may be ultrasonically welded to the exterior surfaces of the housing cover 108 and the lower portion of the main housing 100, which form the lower portions of the sides 28 of the camera housing 22. In some embodiments the camera housing 22 is made from brushed aluminum, baked fiberglass, and rubber. In particular, the main housing 100, the housing cover 108, and the side caps 112 may be made from aluminum. The front and bottom trim piece 106 may also be ultrasonically welded to the main housing 100.

With reference to FIGS. 3A, 3B, 4A, 4B, 6, and 9, in preferred embodiments, the digital video camera 10 includes part of a mounting system 120 that has two or more housing rail cavities 122 and two or more interleaved housing rails 124 on each side 28 of camera housing 22 for engaging a versatile mount 126. An example of such a mounting system 100 is the TRail™ mounting system, marketed by Twenty20, Inc, of Seattle, Washington.

The housing rail cavities 122 and housing rails 124 may be formed by cut outs in the side caps 112 that are mounted to the main housing 100. In some embodiments, digital video camera 10 is bilaterally symmetrical and has an equal number of housing rail cavities 122 on each of the side caps 112 and an equal number of housing rails 124 on each of the side caps 112. In some embodiments, digital video camera 10 may for example provide two housing rail cavities 122 (such as shown in FIGS. 3A and 3B) or three housing rail cavities 122 in each side cap 112 (such as shown in FIGS. 4A and 4B). Skilled persons will appreciate, however, that in some embodiments, digital video camera 10 need not be symmetrical and may have an unequal number of rail cavities 122 on its side caps 112.

In some embodiments, the rail cavities 122 have a "T"-like, wedge-like, or trapezoid-like cross-sectional appearance. Skilled persons will appreciate that the dimensions of the stem or lateral branches of the "T" can be different. For example, the stem can be thicker than the branches, or one or more of the branches may be thicker than the stem; similarly, the stem can be longer than the branches, and one or more of the branches may be longer than the stem. The cross-sectional shapes may have flat edges or corners, or the edges or corners may be rounded. Skilled persons will also appreciate that numerous other cross-sectional shapes for the rail cavities are possible and that the cross-sectional shapes of different housing rail cavities 122 need not be the same whether in the same side cap 112 or in different side caps 112. Similarly, the housing rail cavities 122 may have different lengths and the housing rails 124 may have different lengths. The bottom of trim piece 106 may be alternatively or additionally fitted with housing rails 124.

In some embodiments, one or more of the housing rail cavities 122 may contain one or more bumps or detents 128. In some embodiments, each side 28 of camera housing 22 contains at least one bump or detent 128. In some embodiments, each housing rail cavity 122 contains at least one bump or detent 128. In some examples, however, only a single housing rail cavity 122 on each side 28 contains a bump or detent 128. Skilled persons will appreciate that the different sides 28 need not contain the same number of nubs or detents 128.

Figure 9:
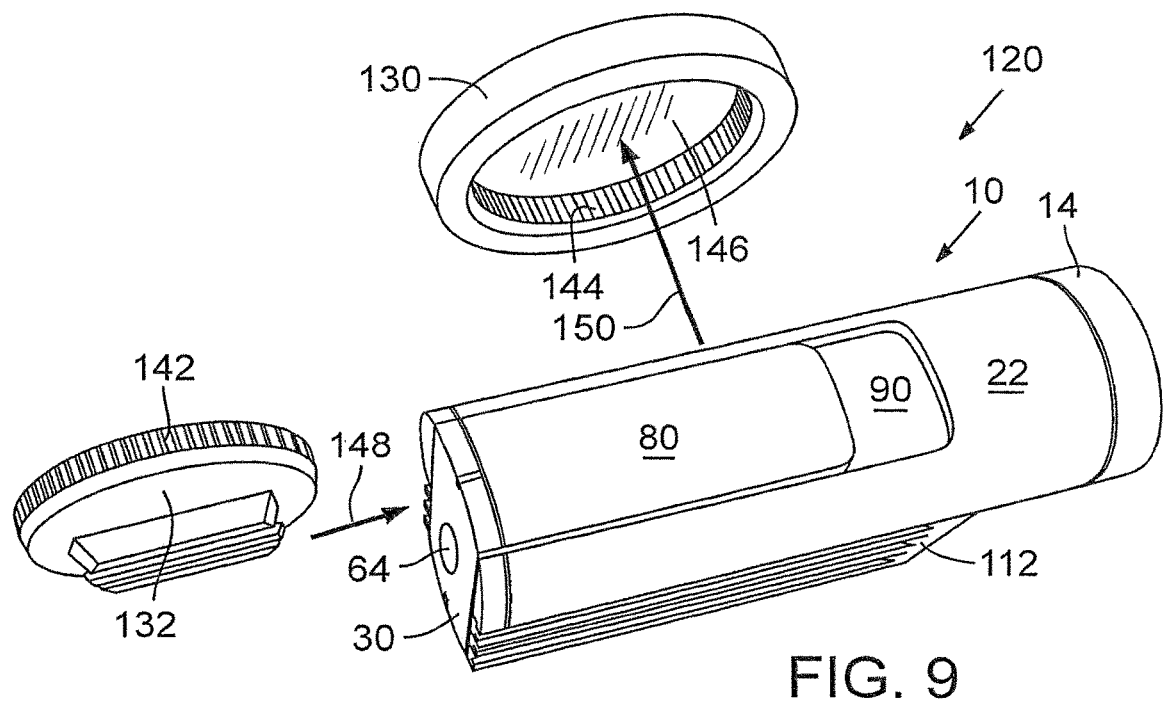
FIG. 9 is a partly exploded view of a versatile mounting system demonstrating ease of adjustment of camera mount orientation coupled with ease of camera detachment with retention of the mount orientation.
Figure 10:
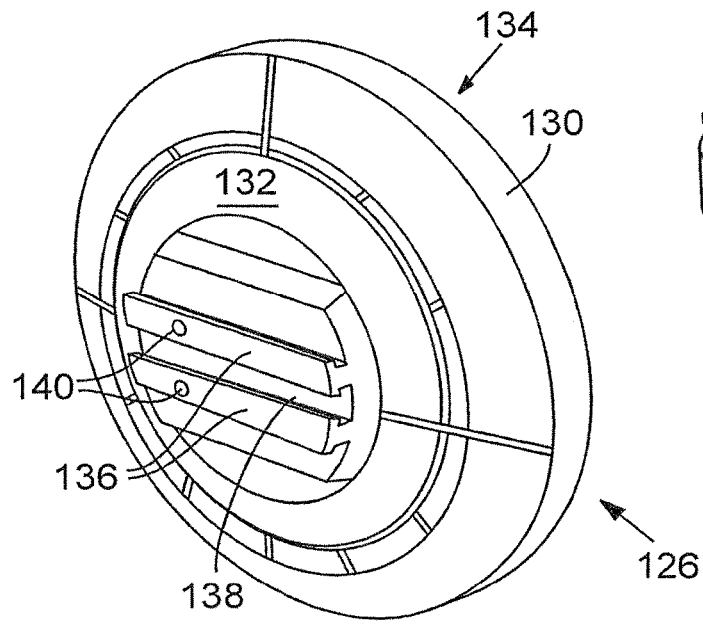
FIG. 10 is a front perspective view of a standard mount, employing a rail plug having two rails and two detents.

FIG. 9 shows a mount base 130 and a rail plug 132 that fit together to form a flat surface mount 134 shown in FIG. 10. FIGS. 11A-11D (FIG. 11) depict different views of the camera housing 22 mated with the flat surface mount 126. With reference to FIGS. 9-11, the rail plug 132 contains one or more mount rails 136 that are adapted to mate with the housing rail cavities 122 on camera housing 22. Similarly, the rail plug 132 contains one or more mount rail cavities 138 that are adapted to mate with the housing rails 124 on camera housing 22. The mount rails 136 may have the same or different cross-sectional shapes as those of housing rails 124, and the mount rail cavities 138 may have the same or different cross-sectional shapes as those of the housing rail cavities 122. In some preferred embodiments, the rails 124 and 136 and cavities 122 and 138 have the same cross-sectional profiles.

In some embodiments, one or more of the mount rails 136 on the rail plug 132 may contain one or more detents or bumps 140. In some embodiments, each mount rails 136 contains at least one detent or bump 140. In some examples, however, only a single mount rail 136 contains a detent or bump 140. The detents or bumps 140 are adapted to mate with the bumps or detents 128 such that if the camera housing 22 has detents 128 then the rail plug 132 has bumps 140 or if the camera housing 22 has bumps 128 then the rail plug 132 has detents 140. Skilled persons will appreciate that in some alternative embodiments, the housing rails 124 have the bumps or detents 128 and the mount rail cavities 138 have the detents or bumps 140.

The versatile mounting system 120 provides for ease of mounting and orientation of the digital video camera 10 with ease of detachment of the digital video camera 10 with retention of the mounted orientation. In some embodiments, the base mount 130 may have a very small footprint and may be attached to a surface with an adhesive pad designed for outdoor use. After the base mount 130 has been attached to a surface, the rail plug 132 can be detached from the base mount 130.

In some embodiments, the rail plug 132 has a circumferential saw-toothed edge 142 that is mated to a saw-tooth-receiving inside edge 144 of a base mount cavity 146 adapted to receive the rail plug 132. In some embodiments, the rail plug 132 has a compression fit within the base mount 130. In some embodiments, hook and loop double-toothed Velcro™ may be used instead of or in addition to a compression fit technique to further secure the rail plug 132 within the base mount 130.

The mount rails 136 of the rail plug 132 can slide into the housing rail cavities 122 of the camera housing 22 as the mount rail cavities 138 of the rail plug 132 slide onto the housing rails 124 of the camera housing 22 as indicated by arrow 148 to secure the rail plug 132 to the camera housing 22. The mated detents and bumps 128 and 140 can be engaged to prevent unintended lateral movement of the rail plug 132 with respect to the camera housing 22. The rail plug 132 with the attached digital video camera 10 can be rotated from zero to 36 degrees within a plane perpendicular to the base mount 130 to capture a desired viewing angle. Then, the rail plug 132 can be inserted or re-inserted into the base mount 130 as indicated by arrow 150. FIG. 11 shows from several different views how the mated digital video camera 10, the rail plug 132, and the mount base 130 appear when they are mated together.

In some embodiments, the rail plug 132 and base mount 130 may be made from a hard, but flexible material such as rubber or a polymer with similar properties, but skilled persons will appreciate that the rail plug 132 and base mount 130 may be made from a hard or soft plastic. As the base mount 130 can be flexible, it can be attached to a variety of surfaces such as the surfaces of helmets, snowboard decks, skis, fuel tanks, windows, doors, vehicle hoods, etc. The material and flexibility of the material of the flat mount 126 may provide a "rubber" dampening affect as well as enhance rail sliding, rail engagement, and plug engagement. The mounting system 120 may also include a runaway leash (not shown).

When recording of an activity is completed, the rail plug 132 with the attached digital video camera 10 may be disengaged from the base mount 130 for safe storage or data uploading. The base mount 130 can be left attached to the surface and need not be re-attached and/or re-adjusted. Alternatively, the camera housing 22 can be disengaged from the rail plug 132, leaving the rail plug 132 engaged with the base mount 130 so that the original orientation of the mount rails 136 of the rail plug 132 is maintained to permit quick reattachment of the digital video camera 10 without requiring its orientation to be re-adjusted to the base mount 130 or the person, equipment, or vehicle to which the base mount 130 is mounted.

Figure 12:
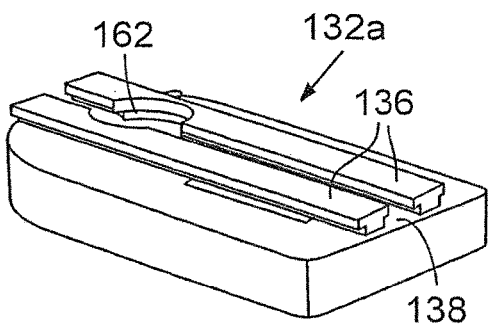
FIG. 12 is a perspective view of an alternative mount, employing two mounting rails and two detents.

FIG. 12 shows an alternative rail plug 132a; and FIGS. 13A, 13B, 13C, 13D, and 13E (FIG. 13) show several views of the rail plug 132a with an alternative base mount 130a, including locked and unlocked configurations, to form a pole mount 126a for mounting on a pole 160 such as handle bars. With reference to FIGS. 12 and 13, the rail plug 132a may be used as a stand-alone mount with an adhesive backing or it may be used in conjunction with or integrated into one or more varieties of base mounts 130a. The rail plug 132a may be attached to the base mount 130a through the use of an adhesive mounting, through the use of Velcro™, through the use of a screw, through the use of other conventionally known means, or combinations thereof. The mount rails 136 may be formed to provide an aperture 162 to provide access for a screw and screwdriver to mount the rail plug 132a onto base mount 130a.

The base mount 130a is configured to open and close around poles 160, particularly poles of standardized recreational equipment and especially such poles having small diameters such as 1-1.5 inches (2.5-3.8 cm). In some embodiments, the base mount 130a has a locking pin 164 with a head 166 that can be secured within a lock chamber 168. The locking pin 164 increases compression against the pole 160 to prevent the base mount 130a from rotating around the pole 160 after its desired positioned is established. The base mount 130a may also be provided with a pin door cover 170 to prevent debris from accessing the locking pin 164 or the lock chamber 168.

FIGS. 14A, 14B, 14C, 14D, and 14E (FIG. 14) show several views of a rail plug 132b with an alternative base mount 130b, including a strap 172, to form a pole mount 126b for mounting on a pole 160b such as a roll cage, a windsurfing mast, or a hang glider support. With reference to FIG. 14, in some embodiments, the strap 172 is large enough to accommodate poles 160b having a diameter up to four inches (12 cm) or larger. In some embodiments, a dial 174 may be employed to tighten and loosen the strap 172. In other embodiments, the dial 174 controls the swivel of the rail plug 132 with respect to the base mount 130b so that the side-to-side angle of the digital video camera 10 can be adjusted. As with the rail plug 132a, the rail plug 132b may be attachable to the base mount 130b or may be integrated with it.

FIGS. 15A, 15B, and 15C (FIG. 15) show one view of a rail plug 132e and show several views of a rail plug 132c with an alternative base mount 130c to a band or strap mount 126c for mounting on a belt, strap, or band 180, such as the band 180 of a pair of goggles 182. As with previous embodiments, the rail plugs 132e and 132c may be attachable to the base mount 130c or may be integrated with it. With reference to FIG. 15A, the base mount 130c has a dampener 184a and a strap entrance 186a on an interior side of the base mount 130c, i.e., facing in the opposite direction of the mounting rails 136. The dampener 184a may be made from rubber or other suitable cushioning material to cushion a user's head away from the digital video camera.

With reference to FIG. 15B, the base mount 130c has a dampener 184b on an interior side of the base mount 130c, i.e., facing in the opposite direction of the mounting rails 136. However, the base mount 130c has a strap entrance 186b on an exterior side of the base mount 130c, i.e., facing in the same direction of the mounting rails 136. FIG. 15C shows the base mount 130 of FIG. 15B mounted upon the strap 180 of the goggle 182. Skilled persons will appreciate that the rail plug 132a can be substituted for the rail plugs 132e or 132c.

FIG. 16 shows a rail plug 132d with an alternative base mount 130d to a helmet mount 126d for mounting on a vented helmet. The helmet mount 126 includes one or more slots 190 through which a strap can be used to secure the base mount 130d to a helmet through vent slots in the helmet. Skilled persons will appreciate that the rail plug 132a can be substituted for the rail plug 132d.

Figure 17:
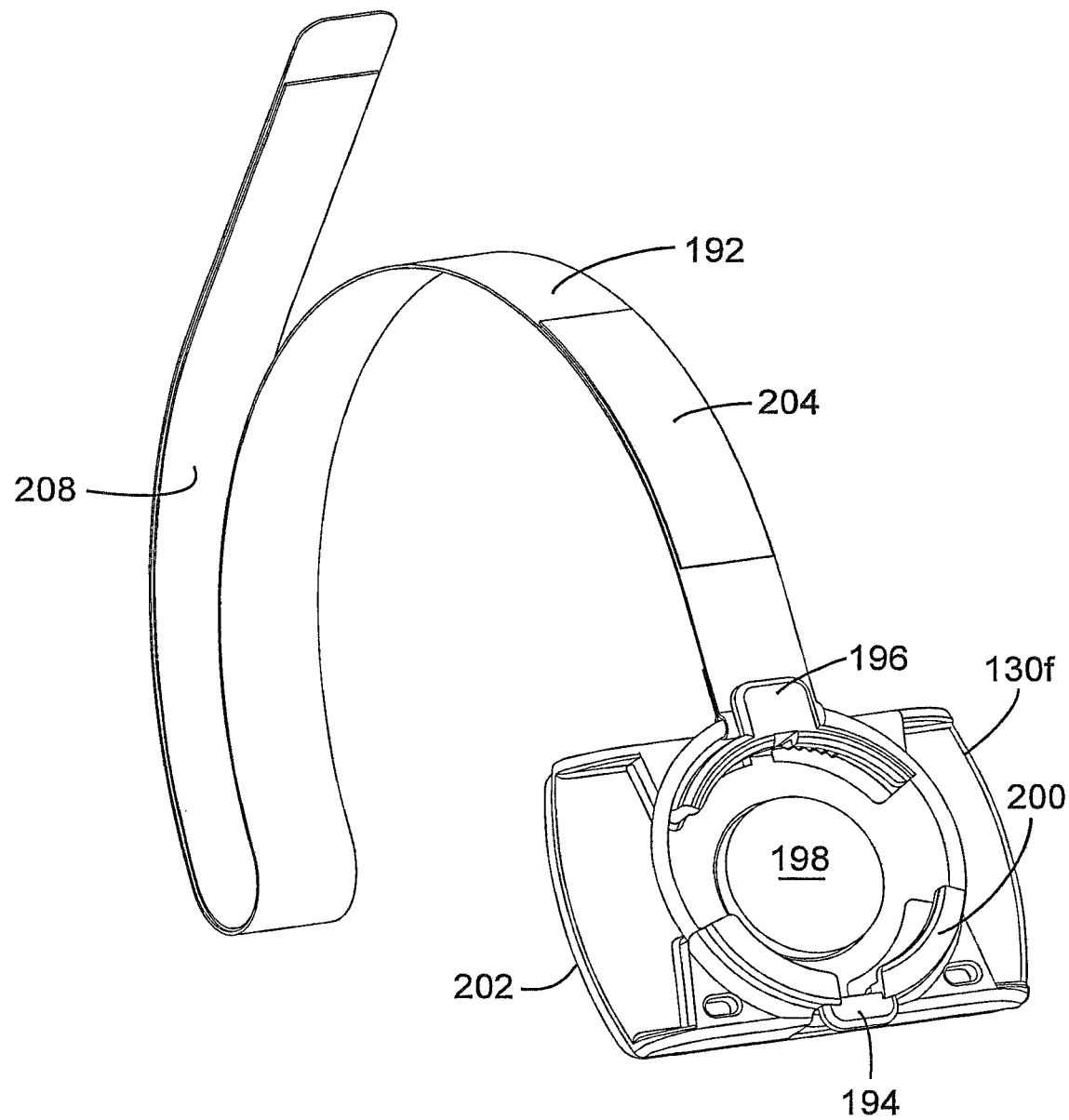
FIG. 17 is a front perspective view of another alternative goggle mount, adapted for employing a strap for attachment to a goggle strap.

FIG. 17 is a front perspective view of another alternative goggle base mount 130f, adapted for employing a strap 192 for attachment to a goggle strap 180. The strap 192 can be looped through buckles 194 and 196 to secure the base mount 130f to the goggle strap 180. The base mount 130f is adapted to receive the circular rail plug 132 (of FIG. 10) that permits 360-degree rotation of the mounting rails 136. Such embodiments permit a user adjust the angle of the digital video camera 10 to be different than the vertical viewing angle of the user. For example, the user can be viewing down at the ground while the digital video camera 10 (and its image sensor 18) captures images straight ahead. In some embodiments, the base mount 130f may include pads 198 and 202 to dampen against vibrations and may include retaining tabs 200 to prevent the rail plug 132 from being inadvertently jarred loose. The strap 192 may also or alternatively include pads 204 and 208.

Figure 18:
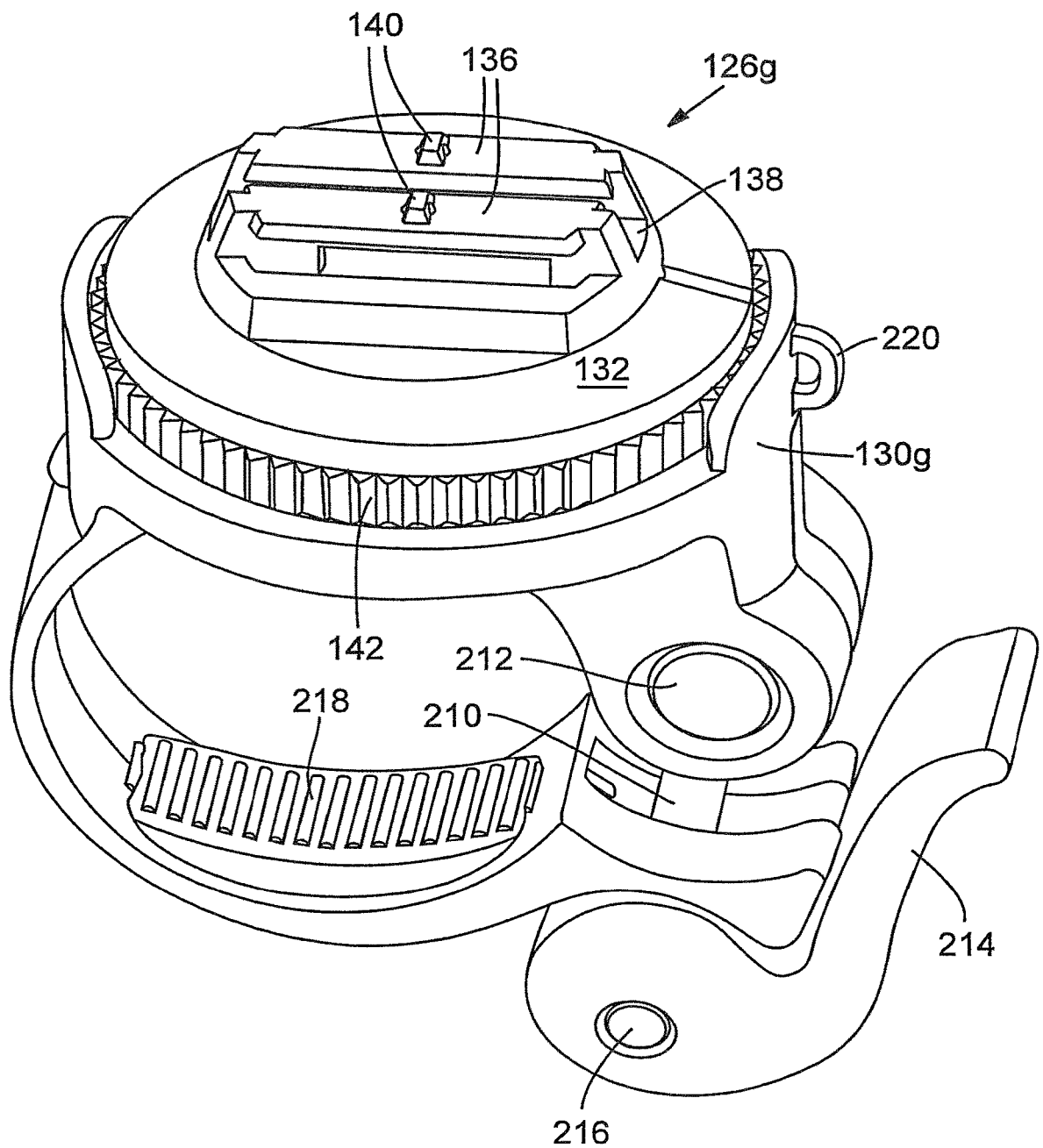
FIG. 18 is a front perspective view of an alternative pole mount system, employing the rail plug of FIG. 10.

Skilled persons will appreciate that base mounts 130a through 130d can also alternatively be configured to receive a round rail plug 132 (of FIG. 10) that permits 360-degree rotation of the mounting rails 136. For example, FIG. 18 shows an alternative pole mount 126g having a base mount 130g adapted to receive the circular rail plug 132 that permits 360-degree rotation of the mounting rails 136. Such embodiments can facilitate compensation for handle bars or other poles 160 or 160b that may be angled backward or forward.

In some embodiments, the base mount 130g has a different locking mechanism than that of base mount 130a (FIG. 13). For example, in some embodiments, a locking pin 210 is attached by a hinge 212 to the base mount 130g, and the locking pin 210 is also attached at its other end to a pin door cover 214 through a hinge 216. The locking pin 210 cooperates with the hinge door cover 214 to increase compression against the pole 160 to prevent the base mount 130g from rotating around the pole 160 after its desired position is established. Skilled persons will appreciate that the base mount 130a may alternatively employ this locking mechanism. In some embodiments, the base mounts 130a and 130g include a pole grip 218 to help maintain a preferred orientation of the base mounts 130a and 130g with respect to the pole 160. In some embodiments, base mounts 130 and 130a-130g may include a leash ring 220 adapted to receive a lease line that may be attached to an associated rail plug 132 (132a-132d), the digital video camera 10, or the operator.

With reference again to FIGS. 3B, 3E, and 5, the button 64 (or an additional button 200) may control one or more status indicators such as the LED 82 that indicates via the light pipe 84 that the digital video camera 10 is recording. The button 64 (or an additional button 220) may, for example, also control operation of an LED 222 that indicates through a light pipe 224 the power status of a battery (not shown). In some embodiments, a single push controls two or more status indicators (or all of the status indicators, and may control the laser sources 48 and a recording standby mode as well).

In some embodiments, the status indicators may provide a different color depending on the status of the item in question. In some embodiments, green, yellow, and red LEDs are used to indicate whether the battery is completely charged, half-charged, or nearly depleted. Similarly, in some embodiments, green, yellow, and red LEDs are used to indicate whether the SD memory card is nearly empty, half-empty, or nearly full. In other embodiments, green light indicates greater than or equal to 80% space or charge, yellow light indicates greater than or equal to 30% space or charge, and red light indicates less than 30% space or charge. Skilled persons will appreciate that the number and meaning of colors can be varied. The camera housing 22 may provide symbols indicating what items the light pipes 84 and 224 designate, such as battery symbol 226 and memory card symbol 228 on the door 30.

To facilitate an easier and more manageable process for the video once it has been recorded, the digital video camera 10 may be designed to automatically segment the video into computer and web-ready file sizes. The segment can be automatically determined by the hardware during the recording process without intervention by the user. In some embodiments, software will automatically close a video file and open a new file at predefined boundaries. In some embodiments, the boundaries will be time-based, for example, ten minutes for each segment, or size-based, for example 10 MB for each segment. Additionally, the segmentation process may be designed so that file boundaries are based on preset limits or so that the user can adjust the segment length to the user's own preferred time. In some embodiments, the video encoder (hardware or software based) will optimize the file boundary by delaying the boundary from the nominal boundary position until a period of time with relatively static video and audio, i.e., when there are minimal changes in motion. Skilled persons will appreciate, however, that in some embodiments, such segmentation may be implemented via software or hardware.

The digital video camera 10 is an all-in-one, shoot and store digital video camcorder and is designed to operate in extreme weather conditions and in a hands-free manner. The digital video camera 10 is wearable and designed for rugged environments (water, heat, cold, extreme vibrations), and the VholdR™ system includes application mounts 126 to attach to any person, equipment, or vehicle. The internal components of the digital video camera 10 may be silicon treated, coated, or otherwise insulated from the elements, keeping the digital video camera 10 operational, no matter the mud, the dirt, the snow, and the rain.

It will be obvious to those having skill in the art that many changes may be made to the details of the above-described embodiments without departing from the underlying principles of the invention. For example, skilled persons will appreciate that subject matter revealed in any sentence or paragraph can be combined with subject matter from some or all of the other sentences or paragraphs, except where such combinations are mutually exclusive. The scope of the present invention should, therefore, be determined by the following claims.

What is claimed is:

1. A digital video camera, comprising:
   a camera housing having a length, a width, and a height, wherein the length of the camera housing is greater than the width of the camera housing;
   a lens coupled to the camera housing;
   an image sensor located within the camera housing and configured to capture light propagating through the lens and produce image data of a scene; and
   a plurality of protrusions, wherein the plurality of protrusions are configured to extend away from a portion of the camera housing in a same direction, wherein the plurality of protrusions define a plurality of cavities, and wherein each of the plurality of cavities is oriented parallel to the width of the camera housing such that a camera interface of a mount can mate with the plurality of cavities in a direction parallel to the length of the camera housing.

2. The digital video camera of claim 1, wherein each of the plurality of cavities has a rounded cross-sectional shape, and wherein a width of each of the plurality of cavities corresponds to a width of the rounded cross-sectional shape.

3. The digital video camera of claim 1, wherein the portion of the camera housing is a bottom of the camera housing.

4. The digital video camera of claim 3, wherein the plurality of protrusions are configured to extend away from the portion of the camera housing in a vertical direction relative to a horizontal image plane of the image sensor.

5. The digital video camera of claim 3, wherein each of the plurality of cavities has a rounded cross-sectional shape, and wherein a width of each of the plurality of cavities corresponds to a width of the rounded cross-sectional shape.

6. The digital video camera of claim 1, wherein the plurality of protrusions are configured to extend away from the portion of the camera housing in a direction that is perpendicular to the length of the camera housing.

7. The digital video camera of claim 6, wherein each of the plurality of protrusions has a rounded cross-sectional shape.

8. The digital video camera of claim 1, wherein a quantity of the plurality of protrusions is equal to a quantity of the plurality of cavities.

9. A digital video camera, comprising:
a camera housing having a first dimension, a second dimension, and a third dimension, wherein the first dimension of the camera housing is greater than the second dimension of the camera housing;
a lens coupled to the camera housing;
an image sensor located within the camera housing and configured to capture light propagating through the lens and produce image data of a scene;
a plurality of protrusions, wherein the plurality of protrusions are configured to extend away from a portion of the camera housing in a same direction; and
a cavity, wherein a dimension of the cavity is oriented parallel to the second dimension of the camera housing such that a camera interface of a mount can engage with the cavity.

10. The digital video camera of claim 9, wherein the portion of the camera housing is a bottom of the camera housing.

11. The digital video camera of claim 10, wherein the plurality of protrusions are configured to extend away from the portion of the camera housing in a vertical direction relative to a horizontal image plane of the image sensor.

12. The digital video camera of claim 10, wherein the plurality of protrusions are configured to extend away from the portion of the camera housing in a direction that is perpendicular to the first dimension of the camera housing.

13. The digital video camera of claim 12, wherein each of the plurality of protrusions has a rounded cross-sectional shape.

14. The digital video camera of claim 9, wherein the portion of the camera housing comprises a mount interface.

15. A digital video camera, comprising:
a camera housing having a length, a width, and a height, wherein the length of the camera housing is greater than the width of the camera housing;
a lens coupled to the camera housing;
an image sensor located within the camera housing and configured to capture light propagating through the lens and produce image data of a scene;
a plurality of protrusions, wherein the plurality of protrusions are configured to extend away from a bottom portion of the camera housing in a same direction; and
a plurality of cavities having a rounded cross-sectional shape, wherein at least one opening of the plurality of cavities is oriented parallel to the length of the camera housing to enable an interface of a mount to mate with the plurality of cavities in a direction that is parallel to the length of the camera housing.

16. The digital video camera of claim 15, wherein a length of the plurality of cavities is parallel to the length of the camera housing.

17. The digital video camera of claim 15, wherein a quantity of the plurality of protrusions is equal to a quantity of the plurality of cavities.

18. A digital video camera, comprising:
a camera housing having a length, a width, and a height, wherein the length of the camera housing is greater than the width of the camera housing;
a lens coupled to the camera housing;
an image sensor located within the camera housing and configured to capture light propagating through the lens and produce image data of a scene, the image data having a horizontal image plane;
a plurality of protrusions, wherein the plurality of protrusions are configured to extend away from a portion of the camera housing in a same direction, wherein the plurality of protrusions define one or more walls; and
one or more cavities, wherein a width of each of the one or more cavities is parallel to the width of the camera housing and a depth of each of the one or more cavities is parallel to the length of the camera housing, wherein the width of each of the one or more cavities is defined by either a distance from a respective first wall of the one or more walls to a respective second wall of the one or more walls or a distance from a respective first portion of the respective first wall to a respective second portion of the respective first wall.

19. The digital video camera of claim 18, wherein a quantity of the plurality of protrusions is equal to a quantity of the one or more cavities.

20. The digital video camera of claim 18, wherein each of the one or more cavities has a rounded cross-sectional shape, wherein the width of each of the one or more cavities corresponds to a width of the rounded cross-sectional shape.

* * * * *